(12) United States Patent
Choudhary et al.

(10) Patent No.: US 11,240,058 B2
(45) Date of Patent: Feb. 1, 2022

(54) SYSTEM AND METHOD TO VIEW OCCUPANT STATUS AND MANAGE DEVICES OF BUILDING

(71) Applicant: QUALCOMM Incorporated, San Diego, CA (US)

(72) Inventors: Ravi Choudhary, San Diego, CA (US); Yinyi Guo, San Diego, CA (US); Fatemeh Saki, San Diego, CA (US); Erik Visser, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 209 days.

(21) Appl. No.: 16/370,836

(22) Filed: Mar. 29, 2019

(65) Prior Publication Data

US 2020/0313923 A1 Oct. 1, 2020

(51) Int. Cl.
*H04L 12/28* (2006.01)
*B60K 35/00* (2006.01)
*H04L 9/32* (2006.01)

(52) U.S. Cl.
CPC .......... *H04L 12/2825* (2013.01); *B60K 35/00* (2013.01); *H04L 9/3231* (2013.01); *H04L 12/2818* (2013.01); *B60K 2370/146* (2019.05); *B60K 2370/148* (2019.05)

(58) Field of Classification Search
CPC .............. H04L 12/2825; H04L 9/3231; H04L 12/2818; B60K 35/00; B60K 2370/148; B60K 2370/146; G06F 3/167; G08B 25/10
See application file for complete search history.

(56) References Cited

U.S. PATENT DOCUMENTS

| | | | | |
|---|---|---|---|---|
| 6,563,430 | B1 * | 5/2003 | Kemink | H04B 1/202 340/12.22 |
| 6,661,340 | B1 * | 12/2003 | Saylor | G08B 25/016 340/3.3 |
| 2006/0230270 | A1 | 10/2006 | Goffin | |
| 2013/0041951 | A1 * | 2/2013 | Lee | G05B 15/02 709/204 |
| 2013/0285837 | A1 * | 10/2013 | Uchida | H04L 43/0876 340/870.02 |

(Continued)

OTHER PUBLICATIONS

International Search Report and Written Opinion—PCT/US2020/024733—ISA/EPO—dated Jul. 31, 2020.

*Primary Examiner* — Oanh Duong
(74) *Attorney, Agent, or Firm* — Moore IP

(57) ABSTRACT

A device to provide information to a visual interface that is mountable to a vehicle dashboard includes a memory configured to store device information indicative of controllable devices of a building and occupant data indicative of one or more occupants of the building. The device includes a processor configured to receive, in real-time, status information associated with the one or more occupants of the building. The status information includes at least one of dynamic location information or dynamic activity information. The processor is configured to generate an output to provide, at the visual interface device, a visual representation of at least a portion of the building and the status information associated with the one or more occupants. The processor is also configured to generate an instruction to adjust an operation of one or more devices of the controllable devices based on user input.

29 Claims, 14 Drawing Sheets

(56) References Cited

U.S. PATENT DOCUMENTS

| | | | |
|---|---|---|---|
| 2014/0354402 A1* | 12/2014 | Joao | H04L 63/08 |
| | | | 340/5.52 |
| 2015/0043887 A1 | 2/2015 | Gurudoss et al. | |
| 2015/0268840 A1* | 9/2015 | Leppanen | B60K 37/06 |
| | | | 715/771 |
| 2015/0364027 A1* | 12/2015 | Haupt | G01W 1/10 |
| | | | 340/521 |
| 2016/0095188 A1 | 3/2016 | Verberkt et al. | |
| 2016/0139755 A1* | 5/2016 | Bushmitch | H04L 67/141 |
| | | | 715/707 |
| 2016/0300467 A1* | 10/2016 | Warren | G08B 21/22 |
| 2016/0301543 A1* | 10/2016 | Ezawa | G06F 3/0482 |
| 2016/0353305 A1* | 12/2016 | Zakaria | H04W 4/80 |
| 2017/0288892 A1* | 10/2017 | Hunt | H04L 12/2825 |
| 2018/0032125 A1* | 2/2018 | Peterson | G06F 3/012 |
| 2018/0331846 A1* | 11/2018 | Meakin | H04L 12/2823 |
| 2018/0352193 A1* | 12/2018 | Sakai | H04R 3/00 |
| 2020/0110532 A1* | 4/2020 | Mani | G06F 3/04847 |
| 2020/0128375 A1* | 4/2020 | Shahmurad | H04W 4/44 |
| 2021/0014078 A1* | 1/2021 | Thompson | H04L 12/2821 |
| 2021/0133695 A1* | 5/2021 | Nichols | G07C 5/0841 |

* cited by examiner

SYSTEM AND METHOD TO VIEW OCCUPANT STATUS AND MANAGE DEVICES OF BUILDING

I. FIELD

The present disclosure is generally related to an interface to control devices in a building.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

A network of "smart" devices within a house, such as Internet-of-Things (IoT)-enabled devices, can be controlled via a "home dashboard" application. For example, a user can turn lights on or off or view feeds from security cameras using a home dashboard application running at a smartphone or another portable personal computing device. However, controlling devices from a remote location may cause problems for an occupant inside the house. To illustrate, turning off the lights in the house may be dangerous or inconvenient for an occupant in the house that is not expecting the lights to be turned off.

III. SUMMARY

In a particular aspect, a device to provide information to a visual interface device that is mountable to a vehicle dashboard includes a memory configured to store device information indicative of controllable devices of a building and occupant data indicative of one or more occupants of the building. The device also includes a processor configured to receive, in real-time, status information associated with the one or more occupants of the building. The status information includes at least one of dynamic location information or dynamic activity information. The processor is configured to generate an output to provide, at the visual interface device, a visual representation of at least a portion of the building and the status information associated with the one or more occupants. The processor is also configured to generate an instruction to adjust an operation of one or more devices of the controllable devices based on user input.

In another particular aspect, a method for providing information associated with occupants of a building includes receiving, in real-time at a dashboard device, status information associated with one or more occupants of the building. The status information includes at least one of dynamic location information or dynamic activity information. The method includes generating, at a visual interface of the dashboard device, a visual representation of at least a portion of the building and of the status information associated with the one or more occupants. The method also includes receiving, at the dashboard device, user input related to control of one or more controllable devices of the building, and generating, at the dashboard device, an instruction to adjust an operation of the one or more controllable devices based on the user input.

In another particular aspect, a non-transitory computer-readable medium includes instructions that, when executed by one or more processors, cause the one or more processors to receive, in real-time, status information associated with one or more occupants of the building. The status information includes at least one of dynamic location information or dynamic activity information. The instructions further cause the one or more processors to generate an output for a visual interface device to provide a visual representation of at least a portion of the building and the status information associated with the one or more occupants. The instructions further cause the one or more processors to receive user input regarding control of one or more controllable devices of the building and generate an instruction to adjust an operation of the one or more controllable devices based on the user input.

In another particular aspect, an apparatus to perform operations to provide information about occupants of a building includes means for receiving, in real-time, status information associated with one or more occupants of the building. The status information includes at least one of dynamic location information or dynamic activity information. The apparatus also includes means for providing a visual representation of at least a portion of the building and the status information associated with the one or more occupants. The apparatus includes means for receiving user input regarding control of one or more controllable devices of the building. The apparatus includes means for generating an instruction to adjust an operation of the one or more controllable devices based on the user input.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Systems and methods operable to view occupant status and manage devices in a building are disclosed. Because a remote user using a conventional home dashboard application (e.g., at a remote phone) to control devices that are within a house can result in inconveniences or safety concerns for occupants of the house, such as turning off the lights in the house when an occupant in the house is not expecting the lights to be turned off, conventional home dashboard applications are not well suited for use when occupants are in the building.

As described herein, devices and systems enable a user to view a visual representation of a house or other building with real-time status information regarding occupants of the building in addition to providing control of devices in the building. In some implementations, the occupant status information includes location and activity information of each occupant and also includes an emotional state and age estimate of each occupant. The occupant status information enables a user of the device to avoid dangers or inconveniences to occupants of the building that may otherwise be introduced by conventional home dashboard applications that do not provide the user with occupant status information. In this context, "real-time" refers to without significant delay. Since the status information pertains to occupants (e.g., humans) of a building, any delay introduced by communication latency, data processing, image or data buffering for playout, etc., is insignificant because such delays are too short for the location or activity of an occupant to have changed significantly and in many cases too short for typical human perception. Thus, "real-time" in the context of the status information indicates that the status information received is descriptive of occupant status within a timescale of human action, such as several seconds or up to one minute.

In addition, various interfaces are described including touchscreen and context-aware speech and gesture recognition to enable ease of use under differing conditions, such as when implemented as a car dashboard display, a mobile device application, or a wall-mounted building management display. In some implementations, access control based on user authorization protects privacy and security of occupants in building, controllable devices in the building, or both, from unauthorized users or viewers of the device.

Figure 1:
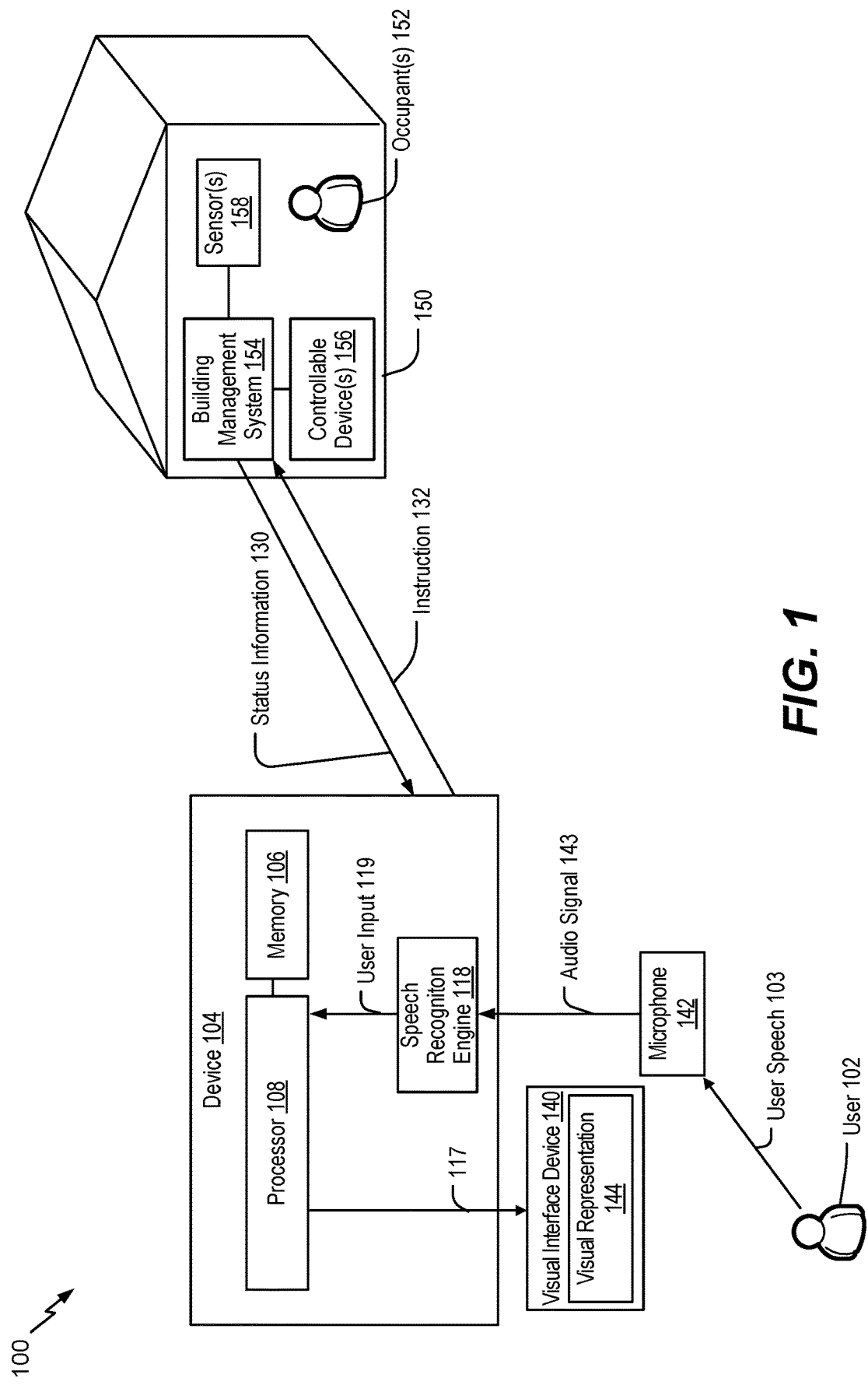
FIG. 1 is a block diagram of a particular illustrative example of a system that includes a device to view occupant status and manage devices in a building.

Referring to FIG. 1, a particular illustrative aspect of a system operable to provide the status of occupants and to manage devices in a building is disclosed and generally designated 100. The system 100 includes a device 104 that is coupled to a visual interface device 140 and to a microphone 142. The device 104 is also coupled to a building 150, such as via one or more wireless networks, one or more wired networks, or a combination thereof.

The building 150 includes a building management system 154 coupled to one or more controllable devices 156 and to one or more sensors 158. The one or more sensors 158 are configured to detect activity related to one or more occupants 152 of the building 150. In a non-limiting example, the building 150 is the home of a user 102 of the device 104. However, in other implementations, the building 150 is another type of building, such as an office building, apartment building, or theater, as non-limiting examples. In an illustrative example, the building management system 154 is a multiple-unit control system, such as for use by an apartment manager.

In some implementations, the one or more sensors 158 include one or more microphones, cameras, infrared sensors, ultrasound sensors, other sensors, or a combination thereof. Occupant activity, such as movement between rooms in the building 150, gestures, and speech, is detected by the one or more sensors 158 and provided to the building management system 154. In some implementations, the building management system 154 is configured to interpret the sensor data to determine identities, ages, and emotional states of the occupants 152 and to transmit the occupant information to the device 104 as status information 130. For example, information regarding an age and an emotional state of an occupant can assist the user 102 in determining what actions to perform via the device 104, as described further below. In some implementations, some or all of the sensor data is instead transmitted to the device 104 and processed at the device 104 to generate a corresponding portion of the status information 130. Alternatively, or in addition, generation of the status information 130 can be distributed between the building management system 154 and the device 104.

The one or more controllable devices 156 are responsive to instructions from the building management system 154. In an illustrative example, the one or more controllable devices 156 include a climate control device such as a central heat and air unit, a lighting device such as a dimmable ceiling light, an entertainment system such as an audio/video system, one or more other controllable devices, or any combination thereof.

The device 104 is configured to provide the user 102 with access to occupant information and control of devices in the building 150 via a visual "home dashboard"—type application. The device 104 is configured to provide a visual representation of the building 150 and the one or more occupants 152, along with a visual representation of the status information 130, to the visual interface device 140 to be displayed to the user 102 as a visual representation 144. The device 104 is also responsive to inputs from the user 102, such as commands spoken by the user 102 in user speech 103 that is captured by the microphone 142, to translate the commands into instructions for controlling the one or more controllable devices 156.

The device 104 includes a memory 106 and a speech recognition engine 118 that are coupled to a processor 108. The memory 106 is configured to store executable instructions (e.g., program code) that are executable by the processor 108 to perform operations associated with the visual "home dashboard"—type application (e.g., receiving and displaying status updates related to the building 150 and receiving user input to control one or more of the controllable devices 156). The memory 106 is also configured to store data associated with the one or more controllable devices 156 and the data associated with one or more occupants 152, as described further with reference to FIG. 2.

The speech recognition engine 118 is configured to receive an audio signal 143 from the microphone 142 and to process the audio signal 143 to generate a user input 119. In an illustrative example, the speech recognition engine 118 is configured to perform automatic speech recognition (ASR) to identify words spoken by the user 102 and to generate a text representation of the identified words. The user input 119 is provided to the processor 108 for processing as a user command to the visual dashboard-type application.

The processor 108 is configured to process the user input 119 to identify a user command from the user 102 and to respond to the user input 119. As an illustrative example, the processor 108 can perform natural language processing (NLP) to map the user input 119 to an action to be performed with regard to the one or more controllable devices 156. For example, a user input 119 that includes the sequence of words "increase the living room lights" can be mapped to an action that increases a brightness level of ceiling lights in a living room of the building 150 by twenty-five percent. The processor 108 generates and transmits an instruction 132 to the building management system 154 that identifies the action to be taken. The processor 108 can update an output 117 to visually present to the user 102 that the action has been performed, such as via a pop-up message or by adjusting an indicator within the visual representation 144 (e.g., adjusting an indicator of the lighting level of the living room to indicate the new lighting level).

Figure 2:
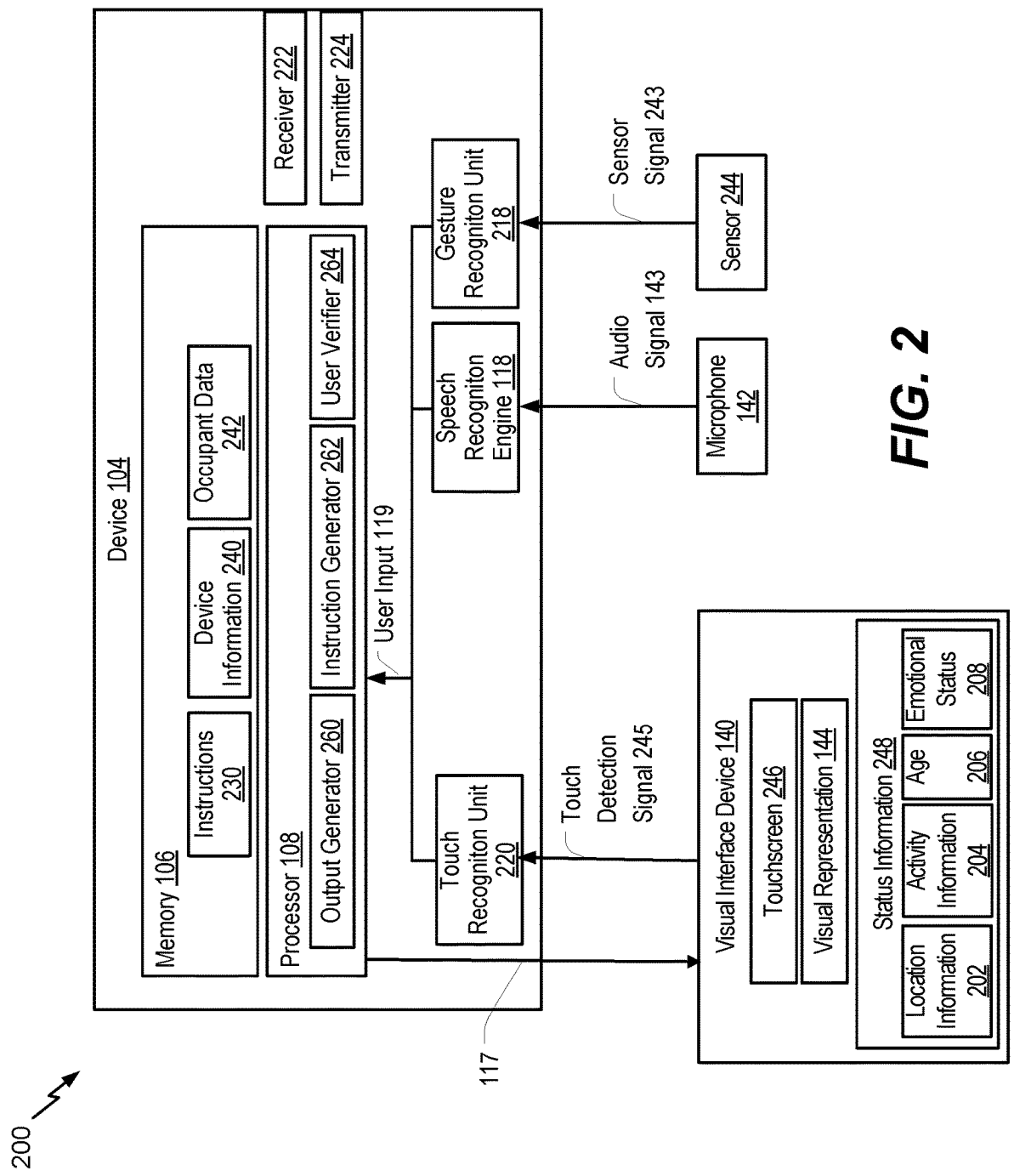
FIG. 2 is a block diagram that includes a first illustrative example of components of the device of FIG. 1.
Figure 6:
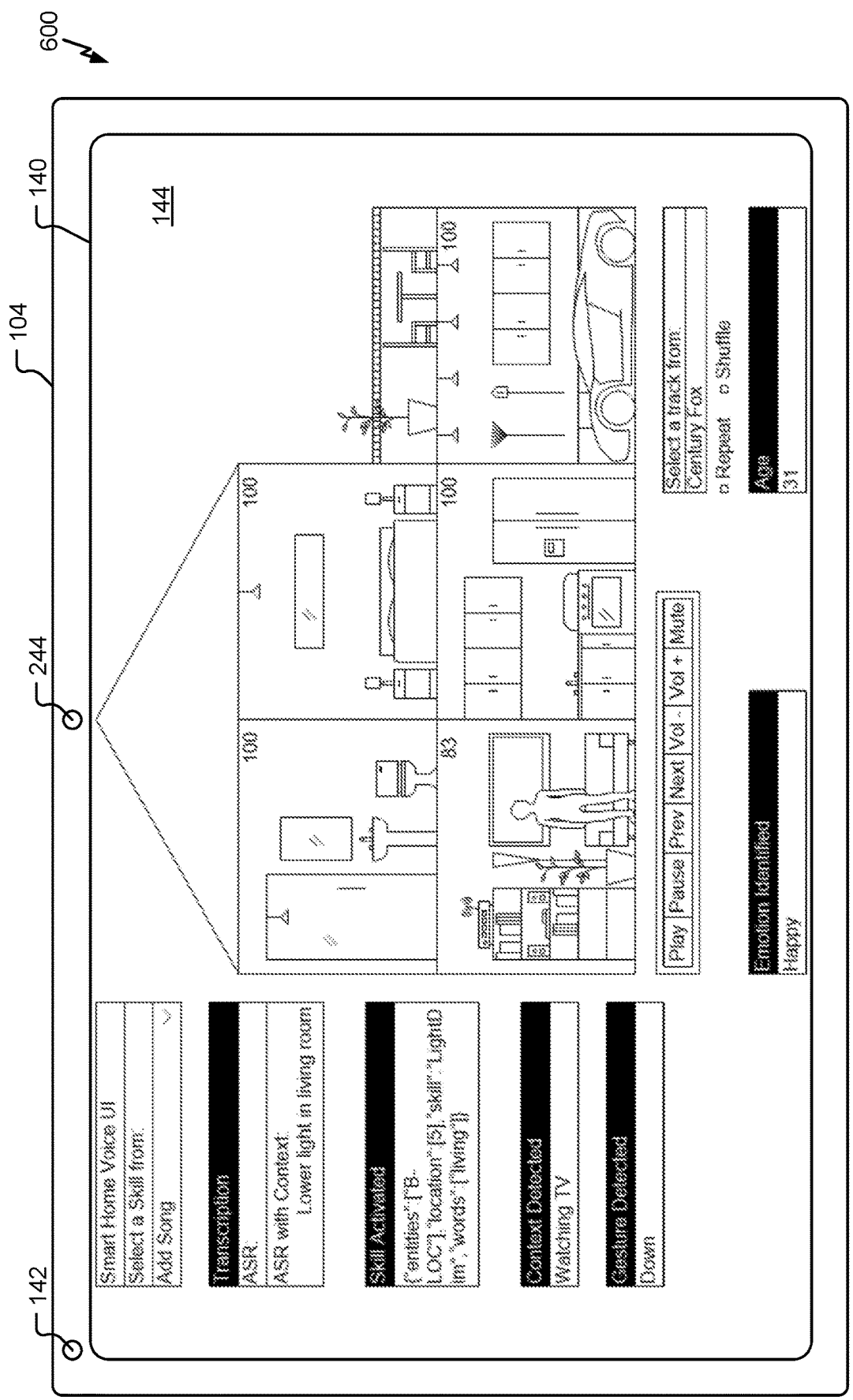
FIG. 6 is a diagram depicting a first illustrative example of the device of FIG. 1.
Figure 7:
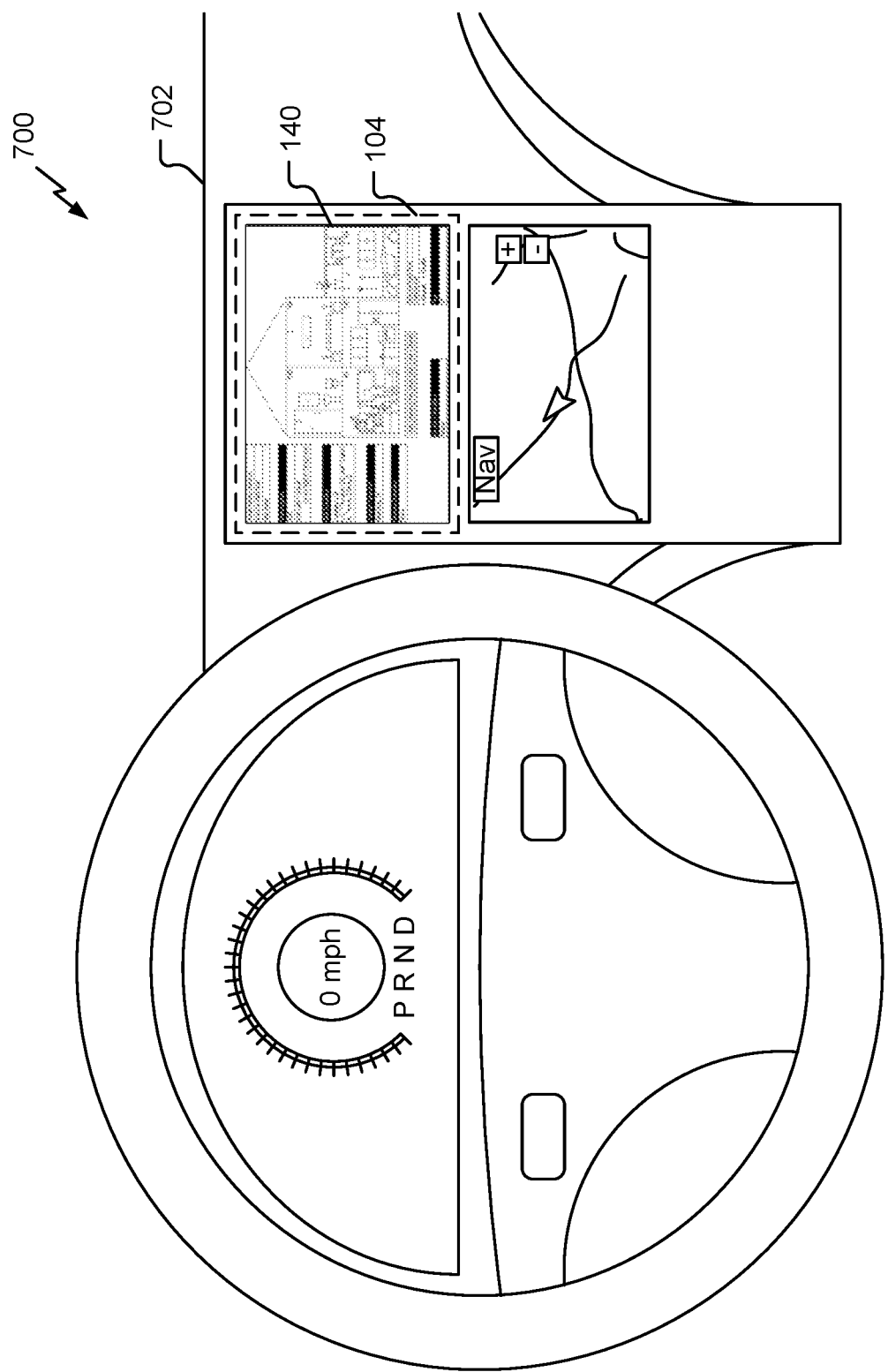
FIG. 7 is a diagram depicting a second illustrative example of the device of FIG. 1.
Figure 8:
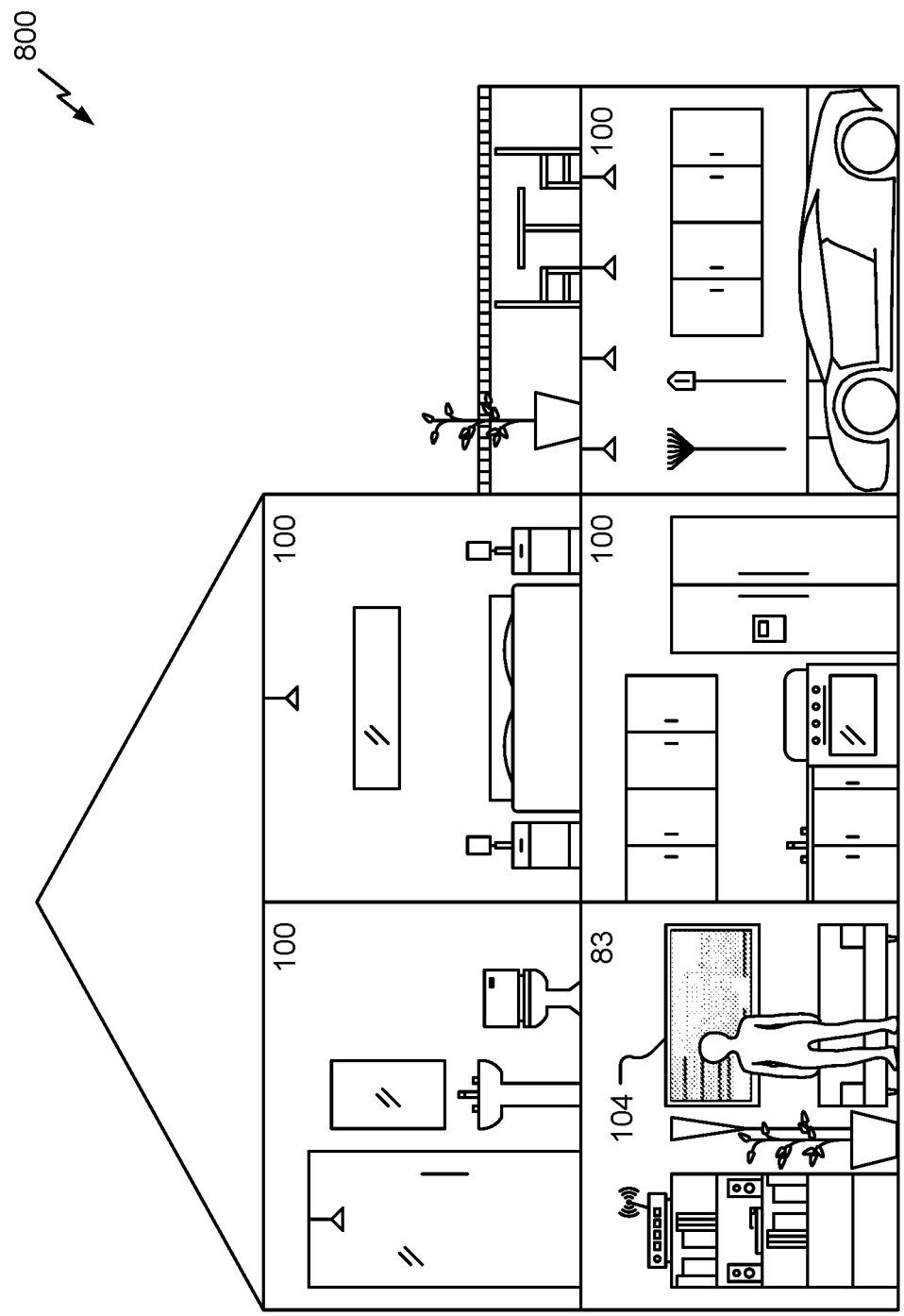
FIG. 8 is a diagram depicting a third illustrative example of the device of FIG. 1.
Figure 10:
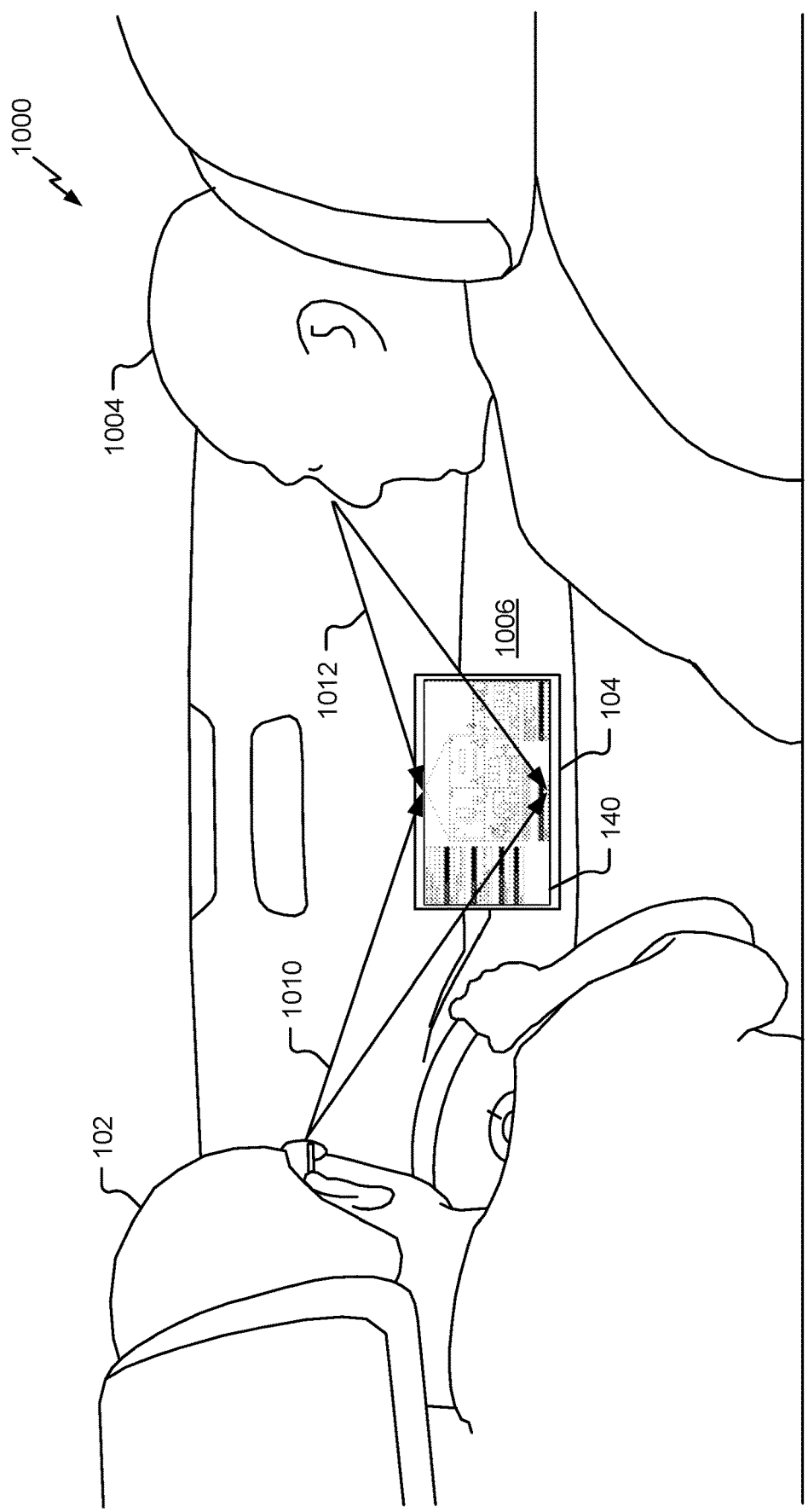
FIG. 10 is a diagram depicting an implementation of the device of FIG. 1 in a vehicle dashboard that is viewable by an operator and a passenger of the vehicle.

In some implementations, the visual interface device 140 is mountable to, or integrated in, a vehicle dashboard, such as illustrated in FIGS. 7 and 10. Alternatively or in addition, in some implementations the visual interface device 140 is integrated in a mobile device, such as in a tablet device as illustrated in FIG. 6. In other implementations, the visual interface device 140 is implemented as a device within the building 150, such as illustrated in FIG. 8. In some implementations the visual interface device 140 includes a touchscreen or other input mechanism to enable the user 102 to enter non-speech commands to the device 104, such as depicted in FIG. 2. In some examples, the visual interface device 140 is configured to provide a holographic display that can provide different versions of the visual representation 144 for different viewers, such as to enable authorized users to view information that is restricted from the view of non-authorized users (e.g., based on positions of the users seated in a vehicle), such as described further with reference to FIGS. 10-12.

During operation, in a particular implementation in which the device 104, the visual interface device 140, and the microphone 142 are integrated in a car, the user 102 (e.g., a car driver) can view the visual representation 144 depicting occupants and conditions in the building 150. The device 104 receives updates to the status information 130, such as detected changes in location, activity, and emotional state of the one or more occupants 152, and updates the visual representation 144 via the output 117 so that the visual representation 144 provides dynamic information regarding the one or more occupants 152 to the user 102. As used herein, "dynamic" information indicates information that is updated in response to detection of a status change at the building 150. The status change is indicated via the status information 130, which may be transmitted to the device 104 in real-time upon detection of change, or may be periodically or continually transmitted to the device 104 and processed by the device 104 to detect the status change.

For example, the device 104 may maintain a record of each of the detected occupants and may update one or more records (e.g., in the memory 106) based on changes indicated in the status information 130, such as when an occupant has changed locations (e.g., a room) within the building 150, changed an activity (e.g., the occupant has stopped watching television and is now participating in a telephonic or in-person conversation), or changed an emotional status. In response to a detected change of one or more of the occupants, the device 104 updates the output 117 to cause the visual interface device 140 to adjust the visual representation 144 to indicate the change. To illustrate, an icon representing an occupant may be removed from one location (e.g., a first room in a graphical map of the building 150) and inserted in another location (e.g., a second room in the graphical map) in response to a change of location of the occupant in the building 150. An example of displaying location, activity, and other status information is described further with reference to FIG. 5.

Based on the status information of the one or more occupants 152, the user 102 can decide whether or how to adjust an operation of one or more of the one or more controllable devices 156. For example, the user 102 can provide spoken commands to turn off lighting in rooms of the building 150 that are unoccupied. As another example, the user 102 can provide spoken commands to cause a home entertainment system to play soft, gentle music when one of the one or more occupants 152 is detected as being in an agitated or angry emotional state, or to play loud, motivational music (e.g., a march) upon detecting that one of the one or more occupants 152 has overslept. As yet another example, the status information 130 can indicate that a first occupant is happy and watching television in a living room and that a second occupant (e.g., a child) is awake and lying in a bed in a bedroom, and the user input 119 can include an instruction from the user 102 to lower a volume of the television to help the second occupant to fall asleep. In this example, the instruction (e.g., the instruction 132) is transmitted to the building management system 154 to cause the television to lower the volume.

The spoken commands are captured by the microphone 142, interpreted as the user input 119 by the speech recognition engine 118, and processed by the processor 108 to generate instructions, such as the instruction 132. The instructions are transmitted to the building management system 154, which causes the instructions to be carried out by the designated one or more controllable devices 156. Changes within the building 150, such as detected by the sensors 158, can be provided to the device 104 as updated status information 130 and displayed to the user 102 via the visual interface device 140.

By providing the user 102 with the real-time status information 130 regarding occupants of the building 150 in addition to providing control of the devices 156, the user 102 can effect changes in the building 150 remotely with reduced risk of inconveniencing the occupants 152 as compared to conventional home dashboard applications that do not provide a user with occupant status information. In implementations in which the occupant status information 130 includes location and activity information of each occupant and also includes an emotional state and age estimate of each occupant, more effective or appropriate actions may be selected by the user 102 by taking into account the occupant age and emotional state as compared to when the user 102 does not have such information.

Although in some implementations the device 104 can communicate with the building management system 154 which controls the one or more controllable devices 156 and interfaces with the one or more sensors 158, in other implementations the device 104 is configured to interact with the one or more controllable devices 156 and the one or more sensors 158 absent a central management system (e.g., the building management system 154 may be omitted), such as in a distributed internet of things (IoT) implementation.

It should be noted that various functions performed by the system 100 of FIG. 1 are described as being performed by certain components or modules. However, this division of components and modules is for illustration only. In an alternate aspect, a function performed by a particular component or module may be divided amongst multiple components or modules. Moreover, in an alternate aspect, two or more components or modules of FIG. 1 may be integrated into a single component or module. Each component or module illustrated in FIG. 1 may be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

FIG. 2 depicts an example of a system 200 that includes an implementation of the device 104. The device 104 is coupled to the visual interface device 140, the microphone 142, and a sensor 244. For example, the device 104 may be integrated into a component that is distinct and separate from the visual interface device 140, the microphone 142, and the sensor 244. To illustrate, the visual interface device 140 may be integrated into a car dashboard device, the microphone 142 may be part of a microphone array in an interior of the car, and the sensor 244 may be integrated into another interior component of the car. The device 104 may be implemented in an electronics package of the car and coupled to the visual interface device 140, the microphone 142, and the sensor 244 via one or more wires or via wireless signaling.

The device 104 includes the memory 106 and the processor 108. The memory 106 is configured to store instructions 230 that are executable by the processor 108 to perform functionality described herein. The memory 106 is further configured to store device information 240 indicative of the one or more controllable devices 156 of the building 150. The memory 106 is also configured to store occupant data 242 indicative of one or more of the one or more occupants 152 of the building 150.

The processor 108 is coupled to the memory 106 and includes an output generator 260, an instruction generator 262, and a user verifier 264. In some implementations, one or more, or all, of the output generator 260, the instruction generator 262, or the user verifier 264 are implemented via execution of the instructions 230 at one or more processing cores of the processor 108. In other implementations, at least a portion of one or more of the output generator 260, the instruction generator 262, or the user verifier 264 is implemented via dedicated hardware or circuitry specific to each particular application.

The processor 108 is configured to receive real-time status information 130 associated with the one or more occupants 152 of the building 150. The status information 130 includes at least one of dynamic location information 202 or dynamic activity information 204. As illustrated, the location information 202 and the activity information 204 can be included in displayed status information 248 provided to the user 102 via the visual interface device 140, as described further below. In addition, the displayed status information 248 can include an estimated age 206 and emotional status 208 associated with each of the one or more occupants 152.

The output generator 260 is configured to generate the output 117 to provide, at the visual interface device 140, the visual representation 144. The visual representation 144 graphically depicts at least a portion of the building 150 and the status information 248 associated with the one or more occupants 152. For example, the visual representation 144 may illustrate a simplified view of one or more interior spaces of the building 150 and may include one or more indicators or icons representing the one or more occupants 152 in approximate locations within the building 150, as described in further detail with reference to FIG. 5.

The instruction generator 262 is configured to cause one or more of the controllable devices 156 to adjust operation based on the user input 119. For example, the user input 119 may represent a command received from the user 102 via an audible speech of the user 102, a touch detection at a touchscreen 246 of the visual interface device 140, or a gesture of the user 102 recognized as a command for the device 104. In an illustrative implementation, the instruction 132 generated by the instruction generator 262 includes at least one of an instruction to cause a climate control device in the building 150 to adjust a temperature, an instruction to adjust a lighting level in at least one room of the building 150, or an instruction to adjust playback settings of an entertainment system in the building 150.

The device 104 includes the speech recognition engine 118. The speech recognition engine 118 is coupled to the processor 108 and is configured to receive the audio signal 143 corresponding to the audible user speech 103 and to translate the audio signal 143 into the user input 119. The microphone 142 is coupled to the speech recognition engine 118 and configured to capture the audible user speech 103 and to generate the audio signal 143.

The device 104 also includes a gesture recognition unit 218 coupled to the processor 108. The gesture recognition unit 218 is configured to receive a sensor signal 243 corresponding to a user gesture. The gesture recognition unit 218 is configured to translate the sensor signal 243 into the user input 119. For example, the sensor 244 is coupled to the gesture recognition unit 218 and is configured to detect a user gesture and to generate the sensor signal 243. To illustrate, the sensor 244 can include at least one of a camera, an infrared sensor, or an ultrasonic sensor. Examples of gestures that may be captured by the sensor 244 include a hand waving gesture, such as a side-to-side hand gesture, a hand rising gesture, a hand lowering gesture, an open hand, a closed hand, a number of extended digits, one or more other gestures, or a combination thereof. Other examples of gestures that may be captured by the sensor 244 include head gestures, such as head nodding or head shaking, facial gestures, or any combination thereof. The gesture recognition unit 218 is configured to interpret the sensor signal 243, such as by processing the sensor signal 243 to form an input for a trained neural network that is configured to classify input signals as gestures.

The device 104 further includes the touch recognition unit 220 configured to receive a touch detection signal 245 corresponding to a user touch and to translate the touch detection signal 245 into the user input 119. For example, the visual interface device 140 includes a touchscreen 246 that is coupled to the touch recognition unit 220. The touchscreen 246 is configured to display the visual representation 144 and to generate the touch detection signal 245. For example, when the visual representation 144 depicts a simplified graphical indication of the building 150, the touchscreen 246 may detect a touched location while displaying the visual representation 144, and the location may be interpreted by the touch recognition unit 220 to identify one or more controls, one or more icons, or one or more locations within the visual representation 144 that are to be manipulated by the user 102.

The user verifier 264 is configured to determine whether a user of the device 104 is an authorized user and to selectively restrict control of the one or more controllable devices 156 based on the determination of whether the user is an authorized user (e.g., a user that is identified as being authorized to access information that is restricted to non-authorized users). For example, the user verifier 264 can be configured to determine, based on whether the user is an authorized user, whether to selectively restrict access to at least a portion of the one or more controllable devices 156. As another example, the user verifier 264 may be configured to receive an identification of the user 102, such as via a credential provided by the user 102, a password, a facial recognition, a voice recognition, a challenge question, other vision-based or biometric-based information, or one or more mechanisms to verify an identity of the user 102. The identified user 102 may be compared against a database of authorized users of the device 104 to determine access to information of the building 150. In some implementations, the device 104 can be used to provide information regarding multiple buildings, such as a user's home, a user's office, and one or more locations. In such circumstances, the user verifier 264 may provide different levels of access, for various users, for each of the multiple buildings that may be accessed via the device 104. In some implementations, restricting access to the status information 248 and to visibility into one or more portions of the building 150 may be based on whether the user 102 is a parent or authorized adult of the building 150, such as when the building 150 corresponds to the home of the user 102. In such cases, an observer of the visual representation 144 that is not an authorized user, such as a passenger in an automobile that includes the device 104, may be unable to see specific information regarding portions of the building 150 or statuses of one or more occupants of the building 150.

The device 104 also includes a receiver 222 and a transmitter 224 coupled to the processor 108. The receiver 222 is configured to receive information, such as the status information 130, and the transmitter 224 is configured to transmit instructions, such as the instruction 132, to the one or more controllable devices 156. Although the receiver 222 and the transmitter 224 of FIG. 2 are depicted as distinct components, in other implementations the receiver 222 and the transmitter 224 may be implemented as a transceiver.

As illustrated, the device 104 receives sensor signals (e.g., the audio signal 143, the sensor signal 243, and the touch detection signal 245) from external sensors and processes the sensor signals to generate the user input 119. In other implementations, however, the device 104 instead receives processed signals as the user input 119, as described further in FIG. 3, or includes one or more sensors, such as the touchscreen 246, the microphone 142, the sensor 244, or any combination thereof. Although FIG. 2 illustrates the device 104 as responsive to user input received via the touchscreen 246, the microphone 142, and the sensor 244, in other implementations the device 104 is responsive to fewer modes of user input, such as a single mode of user input (e.g., touch detection only, user speech only, or gestures only) or is responsive to two modes of user input (e.g., touch detection and user speech, or touch detection and gestures, or user speech and gestures). Although three representative modes of user input are described, other modes of user input can be implemented in addition or, or in place of, the described modes. As an illustrative, non-limiting example, in some implementations a brain-computer interface, such as an electroencephalography (EEG)-based interface, can be used in place of, or in addition to, one or more of the touchscreen 246, the microphone 142, or the sensor 244.

Figure 3:
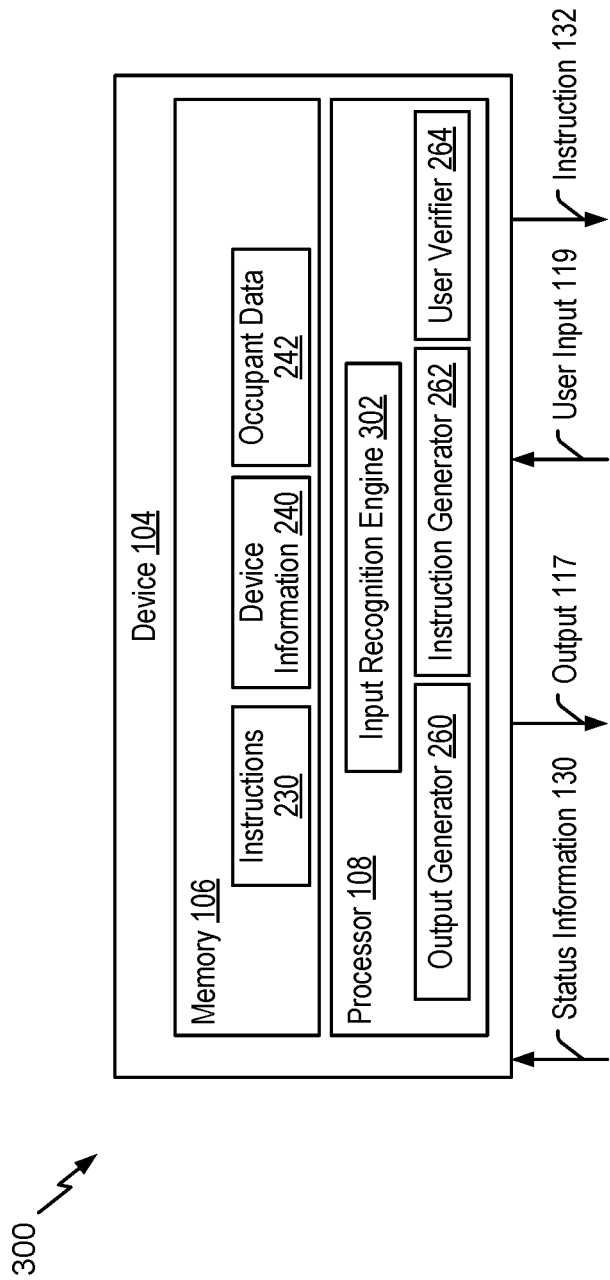
FIG. 3 is a block diagram that includes a second illustrative example of components of the device of FIG. 1.

FIG. 3 depicts an example 300 of the device 104 in an implementation that excludes the touch recognition unit 220, the speech recognition engine 118, the gesture recognition unit 218, the receiver 222, and the transmitter 224 of FIG. 2. The device 104 includes an input recognition engine 302 that is implemented at the processor 108 and that is operable to perform functionality as described with one or more of the touch recognition unit 220, the speech recognition engine 118, or the gesture recognition unit 218 of FIG. 2.

In the example 300, the device 104 may be directly coupled to one or more sensors and the user input 119 may include sensor data, such as the touch detection signal 245, the audio signal 143, and the sensor signal 243, which are processed at the input recognition engine 302. Alternatively, the user input 119 may be received from user interface devices that are also configured to perform signal processing and recognition of sensor signals. For example, the microphone 142 may include or may be implemented in a device that includes a speech recognition engine to process an audio signal generated by the microphone 142 and to output the user input 119 to the device 104. Thus, the device 104 may be implemented as a distinct component that may be coupled to one or more input devices, display devices, transmitting and receiving devices or network interfaces, or any combination thereof.

Figure 4:
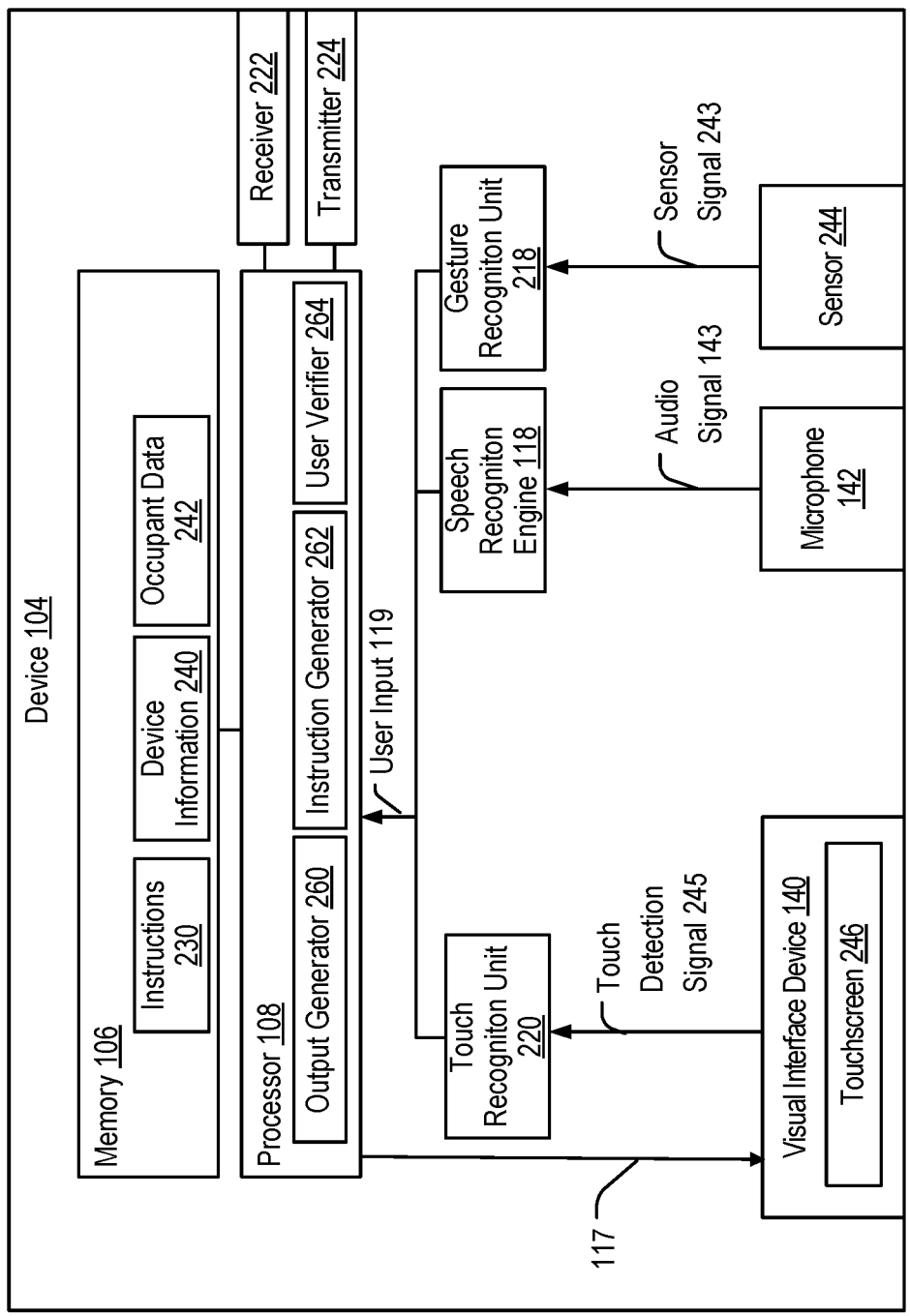
FIG. 4 is a block diagram that includes a third illustrative example of components of the device of FIG. 1.

FIG. 4 depicts an example of an implementation 400 of the device 104 in which the visual interface device 140, the microphone 142, the sensor 244, the touch recognition unit 220, the speech recognition engine 118, and the gesture recognition unit 218 are integrated within the device 104. For example, the implementation 400 can correspond to a mobile electronic device, such as a tablet computer, as described further with reference to FIG. 6. Alternatively, the device 104 may be implemented in a smart phone, a laptop computer, one or more other devices, or a combination thereof. For example, the microphone 142 may include a microphone array of a smart phone, the sensor 244 may include one or more cameras implemented in the smart phone, and the visual interface device 140 may correspond to a screen of the smart phone. The receiver 222 and the transmitter 224 may be coupled to one or more antennas, such as an array of antennas, and may correspond to components for cellular network communications, Institute for Electrical and Electronics Engineers (IEEE) 802.11-type communications, short-distance ad-hoc wireless network communications, such as Bluetooth-type communications, one or more radio technologies, or in combination thereof.

Figure 5:
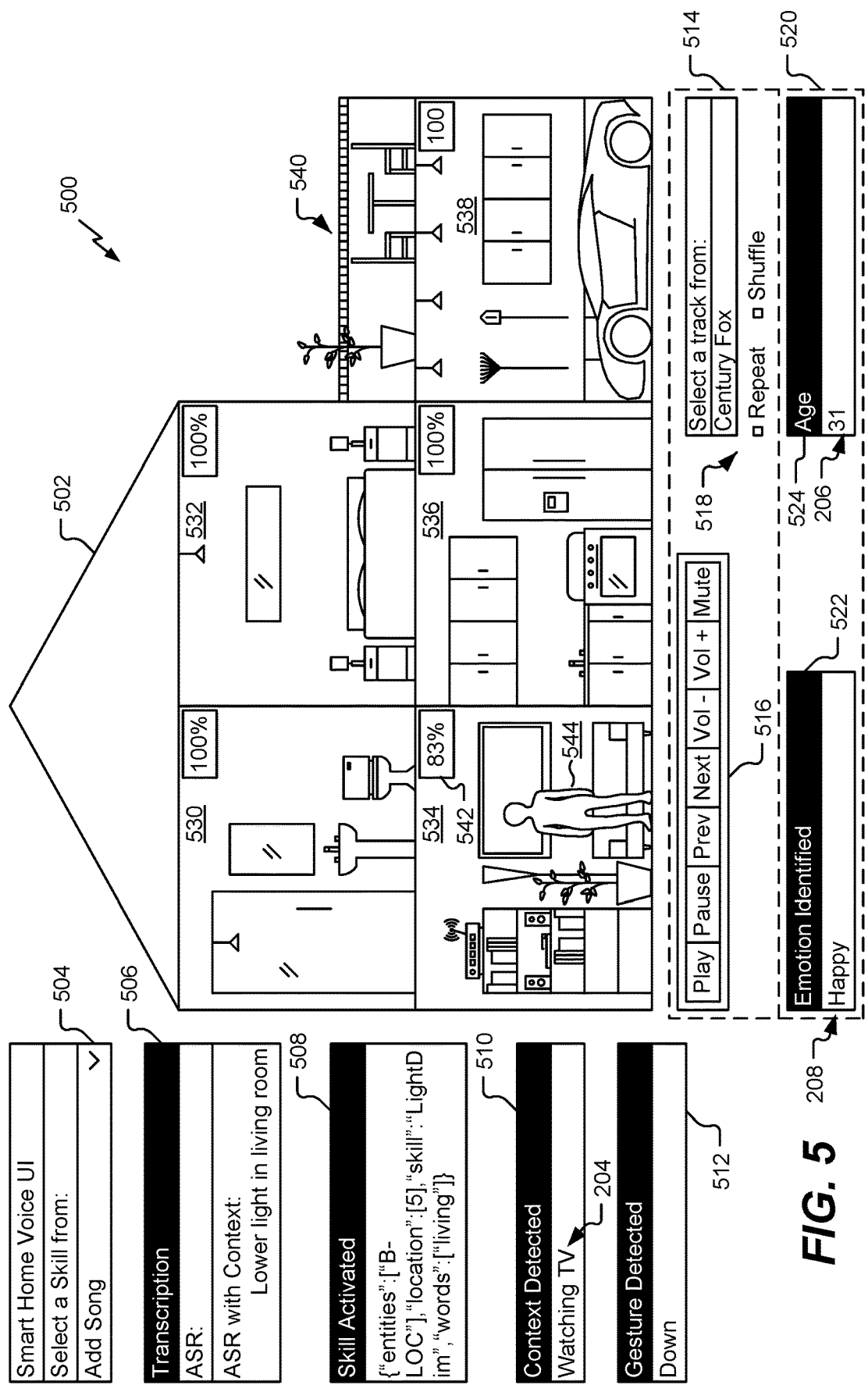
FIG. 5 is a diagram depicting an illustrative example of a visual representation of occupant status and controllable devices that is generated by the device of FIG. 1.

FIG. 5 depicts an example of an implementation 500 of the visual representation 144 and includes a visual representation of at least a portion of the building 150, illustrated as a representation 502 of a house, and various status indicators and user-selectable controls. In particular, the implementation 500 includes a skill or action selector 504, a speech recognition component 506, an action status 508, a context indicator 510, a gesture indicator 512. The implementation 500 also includes controls 514 for operation of a controllable device, illustrated as playback controls 516 and 518 for an entertainment system. Status information 520 includes an indicator 522 of the emotional status 208 and an indicator 524 of the age or estimated age 206.

The representation 502 depicts a bathroom 530, a bedroom 532, a living room 534, a kitchen 536, a garage 538 and a balcony 540. Each of the locations 530-540 of the building 150 may include one or more of the sensors 158 (of FIG. 1) to enable occupant detection, speech recognition, gesture detection, and other information gathering regarding occupants 152 within the sensor's particular location. For example, each of the locations 530-540 may include one or more microphones, cameras, other detectors, or a combination thereof, and may provide sensor information to enable the device 104 of FIGS. 1-4 to display status information of the one or more occupants 152 including each occupant's location information 202, activity information 204, age 206, and emotional status 208. Other environmental information may also be displayed in the representation 502, such as an illumination indicator 542 that indicates a detected light level as a value between 100% (full illumination) and 0% (no detectable light) or a setting of an illumination device, such as a dimmable ceiling light, with 0% indicating the illumination device is off or fully dimmed, 50% indicating that the illumination device is 50% dimmed, and 100% indicating the illumination device is not dimmed.

The location information 202 for each detected occupant 152 may be indicated by display of an icon 544 or other indicator in a respective location 530-540 for the occupant. Although a single instance of the context indicator 510, the indicator 522, and the indicator 524 is illustrated for the single detected occupant that is represented by the icon 544, in an implementation in which multiple occupants are identified within the building 150, multiple instances of the context indicator 510, the indicator 522, and the indicator 524 (one for each of the detected occupants) may be displayed.

The action selector 504 is configured to provide a list of actions or "skills" that can be designated by the user 102, such as a dropdown menu associated with the current context. For example, the user 102 may select, such as via pressing a touchscreen on the icon 544, to indicate the user 102 desires to view or control a context of the occupant associated with the icon 544. In the illustrated example, the context indicator 510 indicates that the occupant indicated by the icon 544 is watching television in the living room 534. The dropdown menu of the action selector 504 provides selectable actions that are appropriate for the context of watching television or operating an entertainment system, such as adding a song. The user 102 may speak the command "lower the light," and the speech recognition component 506 may display an interpretation of the received user speech via automatic speech recognition and in accordance with the context of watching television in the living room 534, as "lower light in living room." As another example, a "down" hand gesture may be detected (e.g., the user 102 lowering a hand from a higher position to a lower position) and interpreted in accordance with the context of watching television in the living room as "lower the television volume." The active skill corresponding to the automatic speech recognition and the context is indicated as the action status 508 and is converted and sent as the instruction 132.

The identified emotional status 208 may be interpreted via a combination of detection of gestures of the one or more occupants 152, speech of the one or more occupants 152, voice characteristics of the one or more occupants 152, such as prosody, or combination thereof. For example, the processor 108 or the speech recognition engine 118 may be configured to receive and process recorded speech of one or more of the occupants 152 to detect one or more prosody elements, such as emphasis, tonality, pitch, speech rate, or one or more other elements. In an illustrative example, duration is one aspect of prosody: if the speech has longer or shorter duration than usual, the speaker is likely in an emotional state, such as sadness, un-satisfaction, hesitation, etc. Other prosody elements like tonality and pitch contour, with which dynamic range is higher or lower than usual may suggest the speaker is happy or frustrated. A relatively complex mapping correlation may exist between all features of prosody and detected emotion. Extracted prosody related features may be used as one of the inputs to an emotion analysis at the processor 108. Alternatively, or in addition, a video capture of one or more of the occupants 152 may be received and processed by the processor 108 to detect one or more physical characteristics of the occupant, such as body language or facial expression. The processor 108 may perform facial expression detection, such as smiling or frowning, or body motion detection, such as nodding, shaking head, or shrugging, or a combination thereof, which may indicate emotional state. The processor 108 may be configured to compare the prosody features, the results of the video processing, or both, to one or more audio emotional models to generate an output indicating one or more confidence levels that one or more respective emotional states have been detected as being experienced by the user.

The estimated age 206 of the occupant can also be estimated based on factors used for emotion identification. For example, an age/gender detector can be trained based on supervised learning approaches. Training speech data of different ranges of age and gender (e.g., children, female adult under 50 years old, female adult 50 years old or older, male adult under 50 years old, etc) could be provided, the trained model can provide an estimated age range and gender upon receiving a speech input. The estimated age 206 can be used to determine whether or not the status information 520 associated with a particular occupant is to be displayed to a viewer of the visual representation 144 that is not an authorized user, such as described further with reference to FIGS. 7-14.

Although the implementation 500 includes the interface components 504-512, in other implementations one or more, or all, of the interface components 504-512 is omitted for clarity of display. For example, the interface components 504-512 may instead be accessible to the user in response to selection via a menu option.

Although the implementation 500 includes the status information 520 below the representation 502 of the building 150 and the icon 544 displayed within the representation 502 of the building 150, in other implementations the status information 520 is instead displayed in conjunction with the icon 544. For example, a "happy face" visual element may be depicted on (e.g., integrated within or overlaid upon) the icon 544 to indicate an identified emotion as happy, and a relative size of the icon 544 may be used as an indicator of an estimated age of that particular occupant.

FIG. 6 depicts a particular implementation 600 of the device 104 in a portable electronic device. For example, the device 104 may include a smart phone or a tablet computer device that includes the microphone 142 and the sensor 244.

FIG. 7 depicts an example of an implementation 700 of the device 104 integrated into a vehicle dashboard device, such as a car dashboard device 702. The visual interface device 140 is mounted within the car dashboard device 702 to be visible to a driver of the car, and the visual interface device 140 may be also visible to one or more passengers of the vehicle. The visual interface device 140 may be integrated within the device 104, such as in the implementation 400 of FIG. 4, or may be separate from and coupled to the device 104, such as in the implementation of the system 200 depicted in FIG. 2.

FIG. 8 depicts an implementation 800 of the device 104 implemented as a home control device within the building 150. As illustrated, the device 104 is as a wall-mounted device in the living room of the building 150, which enables an occupant of the living room to view the location and status information associated with each of the rooms of the building 150 and each of the occupants of the building 150.

Figure 9:
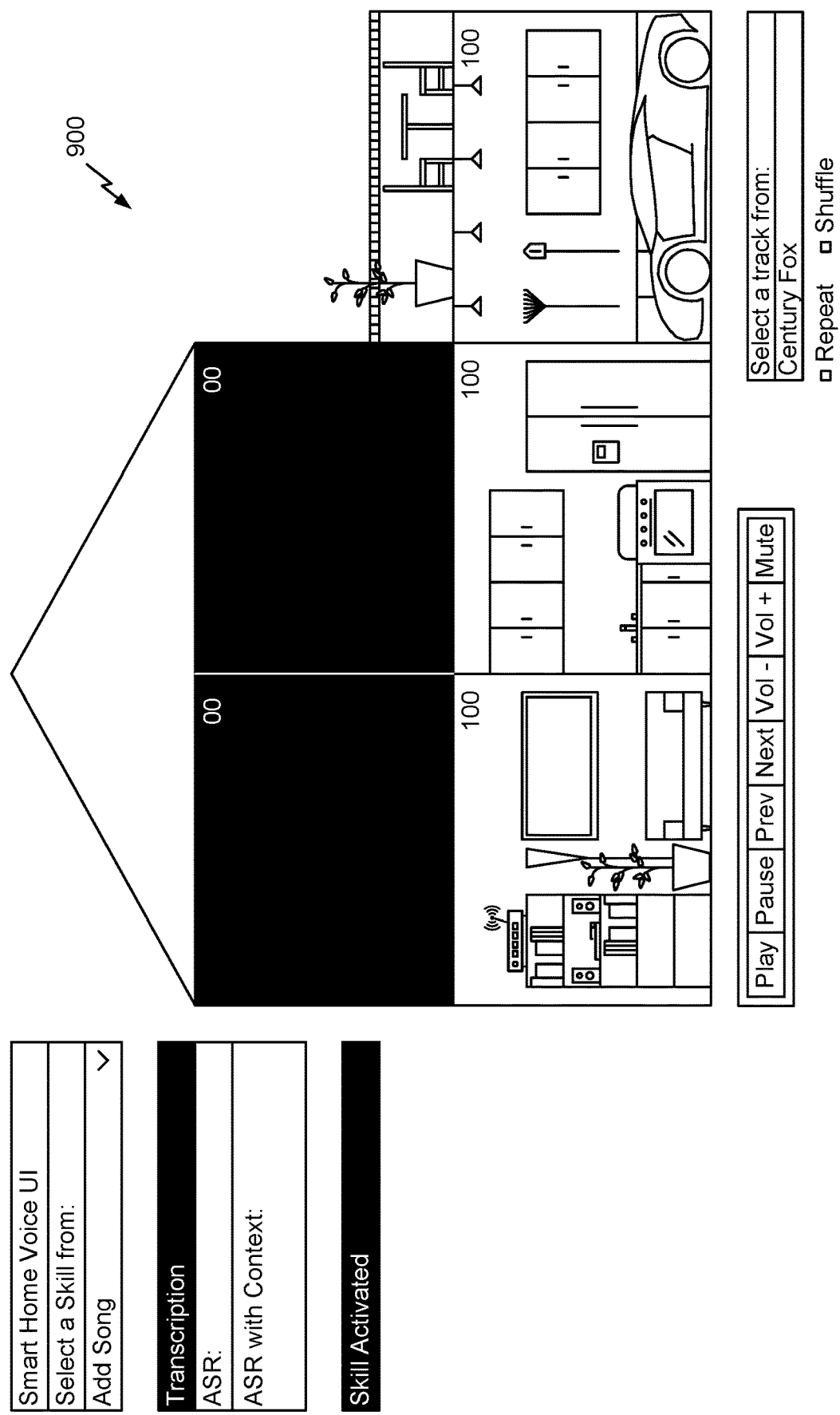
FIG. 9 is a diagram depicting another illustrative example of a visual representation of occupant status and controllable devices that is generated by the device of FIG. 1.

FIG. 9 depicts an example of an implementation 900 of a visual representation 144 in which access to a portion of the building 150 is restricted to a user of the device 104. To illustrate, in an implementation in which a user of the device 104 is not an authorized user, in order to preserve privacy of the owner of the building 150 or of occupants of the private locations in the building 150, private areas of the building 150 may not be displayed. As illustrated, the bathroom 530 and the bedroom 532 of FIG. 5 are blacked out to prevent a non-authorized user of the device 104 from acquiring information regarding the private areas and occupants within the private areas. Similarly, information regarding one or more of the occupants 152 may be removed, such as by not displaying the icon 544 and status information 520 in a situation in which a viewer of the visual representation 144 is determined to be unauthorized to view occupant information. For example, the icon 544 and status information 520 may be omitted when the viewer is not authorized and the occupant is a minor.

FIG. 10 depicts an example of an implementation 1000 in which the user 102 is a driver of a car. The visual interface device 140 is mounted into a car dashboard 1006 and is visible to the user 102 and to a passenger 1004.

In the implementation 1000, the visual interface device 140 incorporates a holographic display which is capable of providing different visual displays for the user 102 associated with a first viewing direction 1010 and the passenger 1004 associated with a second viewing direction 1012. For example, the device 104 may use facial recognition to determine that the user 102 is an authorized user but that the passenger 1004 is not an authorized user. As a result, the device 104 may generate the output 117 to the visual interface device 140 to cause the visual interface device 140 to provide to the user 102 with a visual representation 144 that includes all areas of the building 150, the one or more controllable devices 156, and the one or more occupants 152, as illustrated in FIG. 11, and to provide to the passenger 1004 a reduced content version of the visual representation 144 that omits information regarding the private areas of the building 150 and information regarding the one or more occupants 152, as illustrated in FIG. 12.

Figure 11:
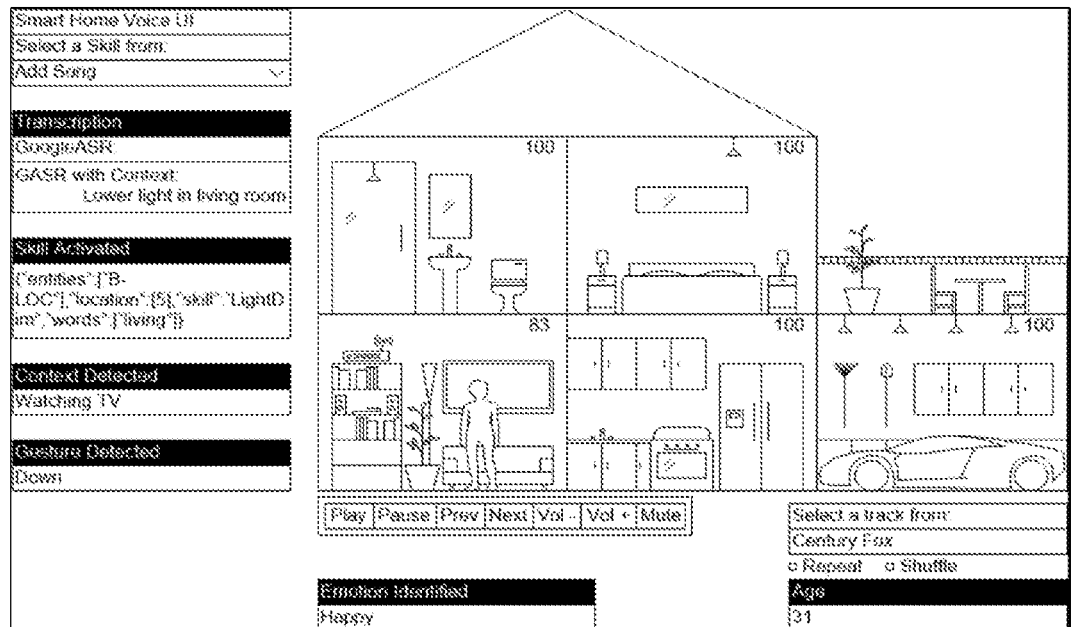
FIG. 11 is a diagram depicting an illustrative example of a visual representation of occupant status and controllable devices that is viewable by the operator of FIG. 10.
Figure 12:
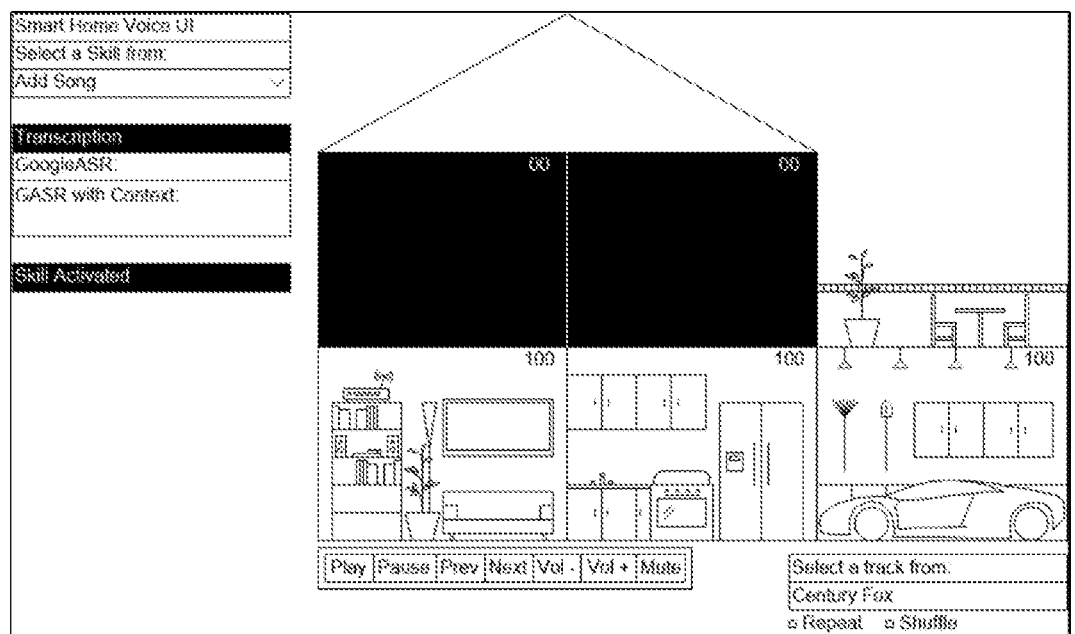
FIG. 12 is a diagram depicting an illustrative example of a visual representation of occupant status and controllable devices that is viewable by the passenger of FIG. 10.

FIG. 11 depicts an example 1100 of the visual representation 144 as seen by the user 102 of FIG. 10, displaying unrestricted information in accordance with the implementation 500 of FIG. 5. In contrast, FIG. 12 depicts an example 1200 of the visual representation 144 that is visible to the passenger 1004 of FIG. 10 and that omits display of sensitive information, such as private locations in the building 150 and occupants of the building 150, such as described with reference to FIG. 9.

By determining whether a viewer is an authorized user of the device and selectively allowing or disabling presentation of information regarding one or more portions of the building 150, the one or more controllable devices 156, the one or more occupants 152, or any combination thereof, granular security and privacy may be provided. Additional information regarding situational display and authorization associated with the device 104 is described in further detail with reference to FIG. 14.

Figure 13:
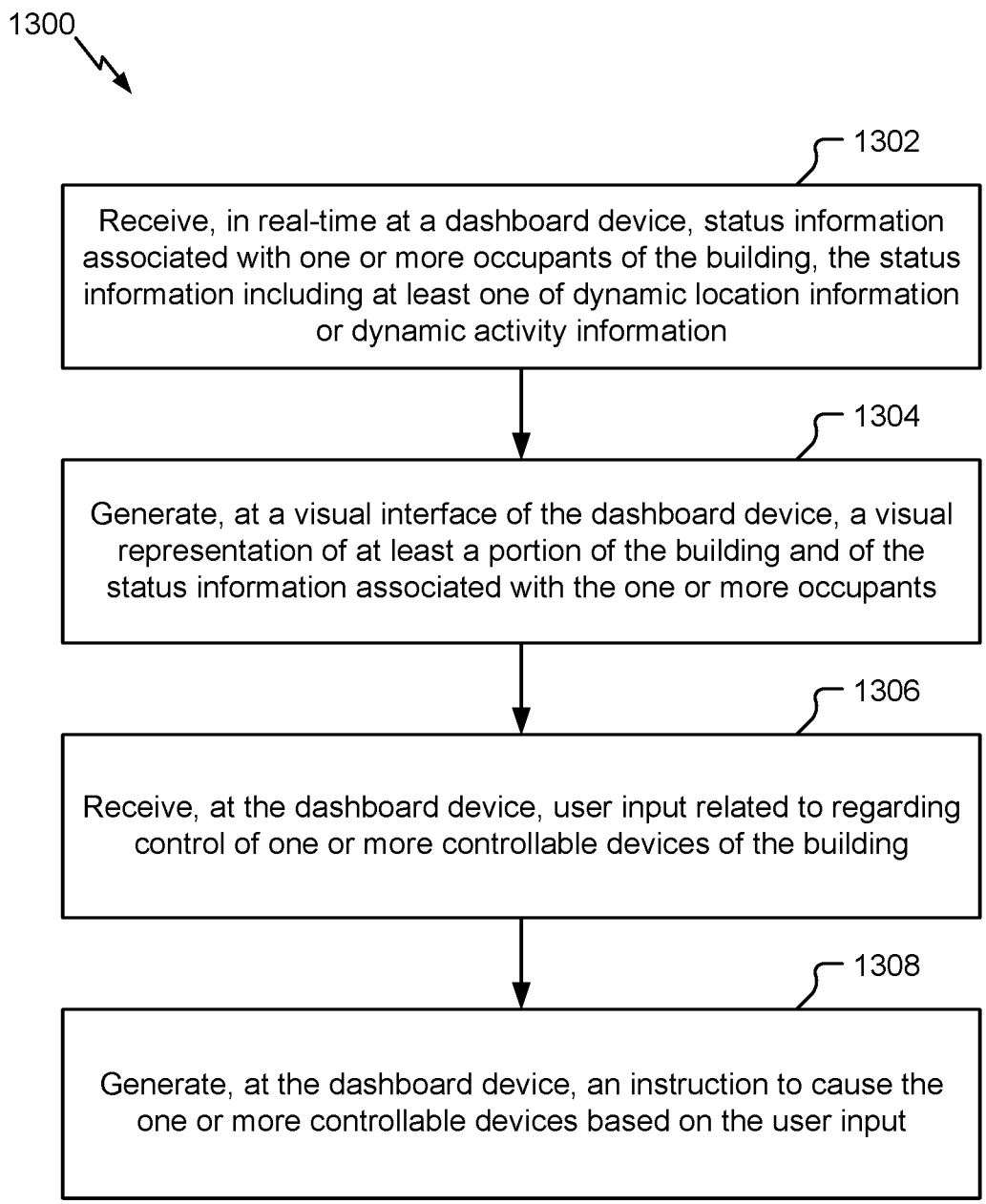
FIG. 13 is a flow chart illustrating a particular method of providing information about occupants of a building.

FIG. 13 depicts an implementation of a method 1300 for providing information associated with occupants of a building. For example, the method 1300 can be performed by a "dashboard" device, such as the device 104. The method 1300 includes receiving, at the dashboard device, real-time status information associated with one or more occupants of the building, at 1302. The status information includes at least one of dynamic location information or dynamic activity information. In some implementations, the status information further includes at least one of an age or an emotional status of at least one of the occupants. In an example, the status information corresponds to the status information 130 received by the device 104.

The method 1300 includes generating, at a visual interface of the dashboard device, a visual representation of at least a portion of the building and of the status information associated with the one or more occupants, at 1304. For example, the visual interface device 140 displays the visual representation 144 depicted in FIG. 5 that includes a cross-sectional graphical depiction of the building 150, distinct status information for each detected occupant 152, and user interface controls to enable a user of the device 104 to adjust operation of the controllable devices 156 in a single display (e.g., on a single screen or holographic image).

The method 1300 includes receiving, at the dashboard device, user input related to control of one or more controllable devices of the building, at 1306. In some implementations, the user input is received via a speech recognition operation, such as via the speech recognition engine 118 operating on the audio signal 143. In some implementations, the user input is received via at least one of a gesture recognition operation, such as via the gesture recognition unit 218 operating on the sensor signal 243, or a touch detection operation, such as the touch recognition unit 220 operating on the touch detection signal 245.

The method 1300 includes generating, at the dashboard device, an instruction to adjust an operation the one or more controllable devices based on the user input, at 1308. For example, the processor 108 generates the instruction 132 to be transmitted to the building management system 154 of FIG. 1.

In some implementations, the method 1300 includes determining whether a user of the dashboard device is an authorized user and selectively restricting at least one of control of the controllable devices or access to at least a portion of the status information based on whether the user is an authorized user. For example, the user verifier 264 may operate to determine whether one or more viewers of the visual representation 144 are authorized users.

In some implementations the dashboard device is in a vehicle, and generating the visual representation includes, in response to the vehicle having a single occupant and the single occupant being an authorized user, incorporating the status information and information regarding the controllable devices, without restriction, into the visual representation. In other implementations, the dashboard device is integrated into a dashboard of a vehicle, and generating the visual representation includes, in response to the vehicle having a single occupant and the single occupant being an unauthorized user, omitting the status information and omitting information regarding controllable devices in non-public areas from the visual representation, such as illustrated in FIG. 9. In response to the vehicle having multiple occupants and the vehicle being in an emergency situation, generating the visual representation may include incorporating the status information and information regarding the controllable devices, without restriction, into the visual representation. In response to the vehicle having multiple occupants and the vehicle not being in an emergency situation, generating the visual representation may include holographically displaying different screens for different occupants. Additional details regarding an example of controlling information displayed based on context and user authentication are described with reference to FIG. 14.

By providing the user with the real-time status information regarding occupants of the building, in addition to providing control of the devices within the building, the method 1300 enables the user to effect changes in the building remotely and with reduced risk of inconveniencing the occupants as compared to conventional home dashboard applications that do not provide a user with occupant status information. In implementations in which the occupant status information includes location and activity information of each occupant and also includes an emotional state and age estimate of each occupant, more effective or appropriate actions may be selected by the user by taking into account the occupant age and emotional state as compared to when the user does not have such information.

Figure 14:
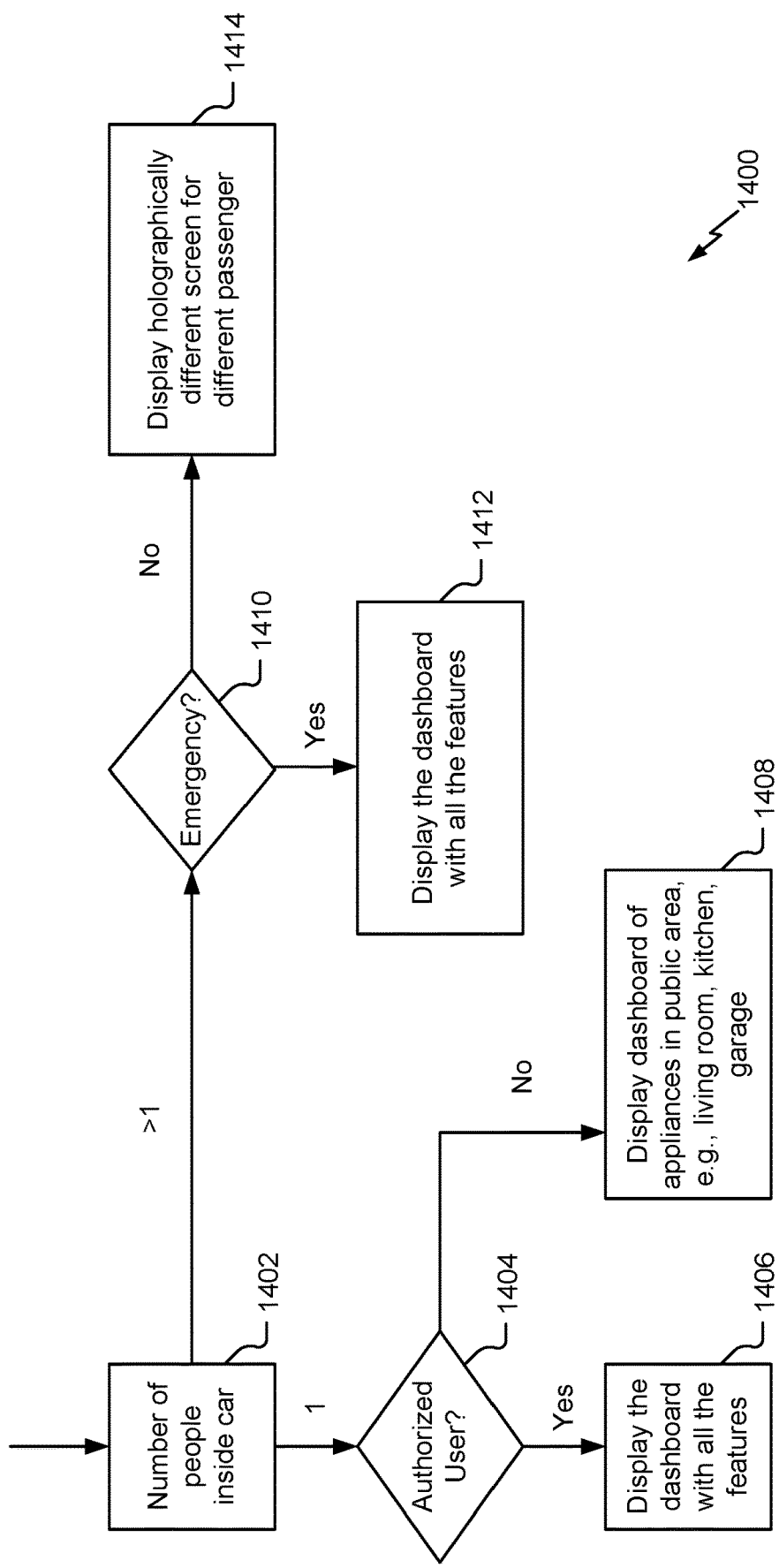
FIG. 14 is a flow chart illustrating another particular method of providing information about occupants of a building.

FIG. 14 depicts an example of a method 1400 of determining one or more visual representations to display at the visual interface device 140, such as in the car dashboard implementation depicted in FIG. 10. The method 1400 includes, at 1402, determining the number of people inside the car. For example, one or more sensors may be used, such as seat sensors, cameras, infrared or ultrasound sensors, or any combination thereof, to determine a number and placement of occupants in the car. In response to determining that a single occupant is in the car, the method 1400 includes determining, at 1404, whether the single occupant is an authorized user. For example, when the occupant is an authorized user, the visual representation 144 (e.g., the "dashboard") provides unrestricted access to private locations, occupant data, and device control options, at 1406. Alternatively, when the occupant is not an authorized user, the method 1400 includes, at 1408, displaying the visual representation 144 to enable control of appliances in public areas, such as in the living room, kitchen, and the garage, and omitting occupant data and information regarding private areas.

Alternatively, when more than one person is detected inside the car, the method 1400 includes, at 1410, determining whether an emergency situation is detected. In some implementations, the emergency situation corresponds to an emergency for the user of the device 104 (e.g., a car wreck that is detected via an accelerometer or other sensor(s) in the device 104 or that is detected by receiving a notification via wireless signaling from an emergency response system of the car). In some implementations, the emergency situation corresponds to an emergency for occupants of the building (e.g., an alarm is activated, such as a smoke alarm, a fire alarm, an air contaminant alarm, or a security alarm, as non-limiting examples, and a notification is sent to the device 104 (e.g., in the status information 130) indicating detection of the emergency situation).

In response to determining that an emergency situation is detected, the method 1400 includes, at 1412, displaying the visual representation 144 with unrestricted information. Otherwise, the method 1400 includes, at 1414, displaying holographically different screens for different passengers. The different visual representations 144 can be based on whether each of the individual passengers is an authorized user or is not an authorized user, such as described previously with reference to FIGS. 10-12.

By identifying the number of passengers in a vehicle and selectively generating different holographic screens for different passengers, a privacy of occupants and devices in the interior of the building 150 may be protected from access by non-authorized users, while authorized users may have full access to status and control information. In emergency situations, all viewers (e.g., an emergency responder) are granted access to the status and control information.

Figure 15:
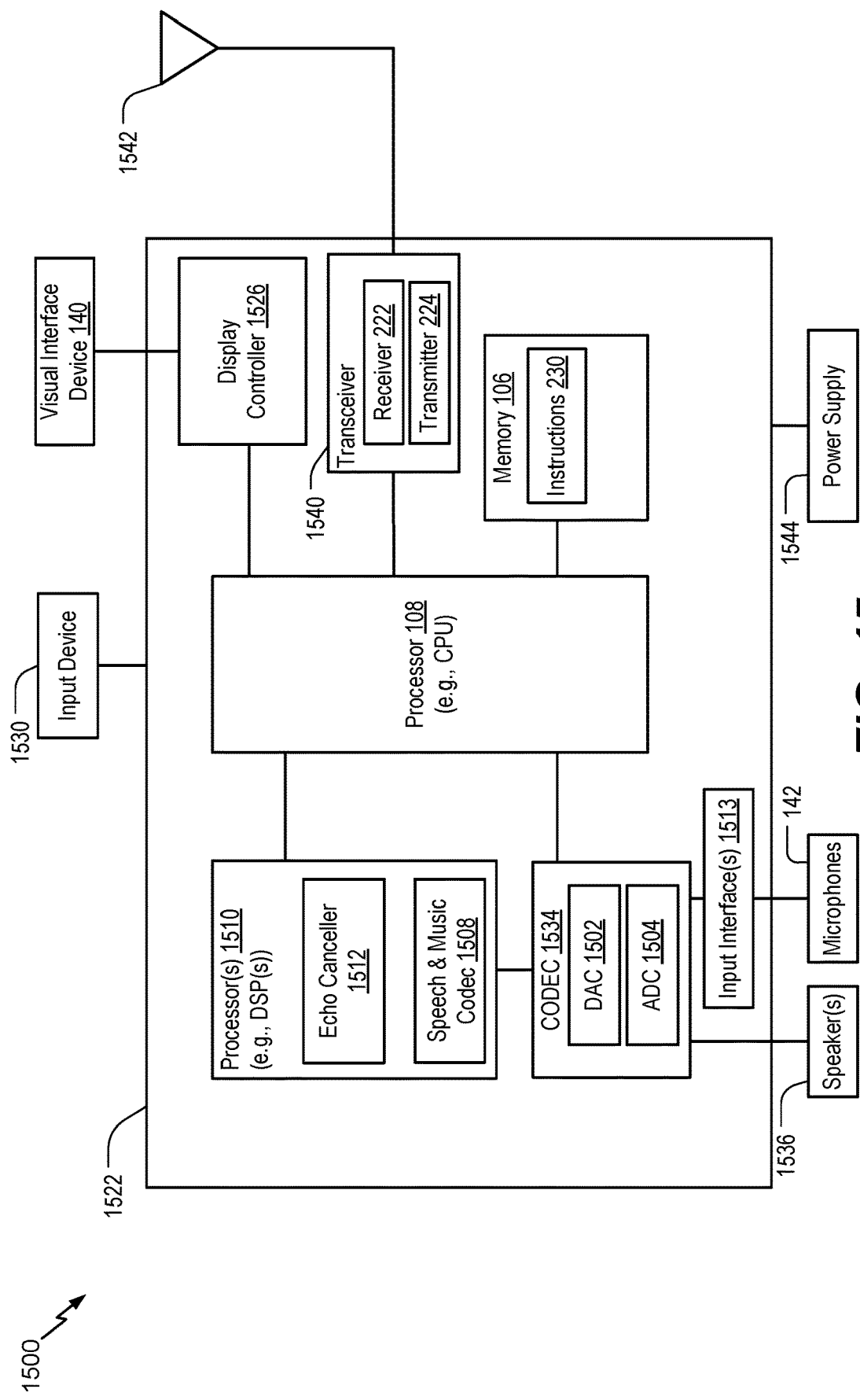
FIG. 15 is a block diagram of a particular illustrative example of a device that is operable to view occupant status and manage devices in a building.

Referring to FIG. 15, a block diagram of a particular illustrative example of a device (e.g., a wireless communication device, a home device, an internet of things (IOT) device, a voice-activated digital assistant, or a combination thereof) is depicted and generally designated 1500. In various examples, the device 1500 includes fewer or more components than illustrated in FIG. 15. In an illustrative example, the device 1500 corresponds to the device 104. In an illustrative example, the device 1500 performs one or more operations described with reference to FIGS. 1-14.

In a particular aspect, the device 1500 includes the processor 108 (e.g., a central processing unit (CPU)). The device 1500 may include one or more additional processors 1510 (e.g., one or more digital signal processors (DSPs)). The processors 1510 include a speech and music coder-decoder (CODEC) 1508, an echo canceller 1512, or both. The processor 108 is coupled via a transceiver 1540 to an antenna 1542. The transceiver 1540 includes the receiver 222, the transmitter 224, or both.

Although the speech and music CODEC 1508 is illustrated as a component of the processors 1510, in other examples one or more components of the speech and music CODEC 1508 are included in the processor 108, a CODEC 1534, another processing component, or a combination thereof. The device 1500 also includes the memory 106. The device 1500 includes the visual interface device 140 coupled to a display controller 1526. One or more speakers 1536, one or more microphones 142, or a combination thereof may be coupled to the CODEC 1534. The CODEC 1534 may include a digital-to-analog converter (DAC) 1502 and an analog-to-digital converter (ADC) 1504.

In a particular aspect, the CODEC 1534 may receive analog signals from the microphones 142, convert the analog signals to digital signals using the analog-to-digital converter 1504, and provide the digital signals to the speech and music CODEC 1508, such as in a pulse code modulation (PCM) format. The speech and music CODEC 1508 may process the digital signals. In a particular aspect, the speech and music CODEC 1508 may provide digital signals to the CODEC 1534. The CODEC 1534 may convert the digital signals to analog signals using the digital-to-analog converter 1502 and may provide the analog signals to the speakers 1536.

The memory 106 may include the instructions 230 executable by the processor 108, the processors 1510, the CODEC 1534, another processing unit of the device 1500, or a combination thereof, to perform methods and processes disclosed herein, such as one or more operations described with reference to FIGS. 1-14. One or more components of the systems and devices described with reference to FIGS. 1-14 may be implemented via dedicated hardware (e.g., circuitry), by a processor executing instructions (e.g., the instructions 230) to perform one or more tasks, or a combination thereof. As an example, the memory 106 or one or more components of the processor 108, the processors 1510, and/or the CODEC 1534 includes a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device includes instructions (e.g., the instructions 230) that, when executed by a computer (e.g., a processor in the CODEC 1534, the processor 108, and/or the processors 1510), causes the computer to perform one or more operations described with reference to FIGS. 1-14. As an example, the memory 106 or the one or more components of the processor 108, the processors 1510, or the CODEC 1534 is a computer-readable storage device that includes instructions (e.g., the instructions 230) that, when executed by a computer (e.g., a processor in the CODEC 1534, the processor 108, and/or the processors 1510), cause the computer perform one or more operations described with reference to FIGS. 1-14.

In a particular aspect, the device 1500 is included in a system-in-package or system-on-chip device 1522, such as a mobile station modem (MSM). In a particular aspect, the processor 108, the processors 1510, the display controller 1526, the memory 106, the CODEC 1534, and the transceiver 1540 are included in a system-in-package or the system-on-chip device 1522. In a particular aspect, an input device 1530, such as a touchscreen and/or keypad, and a power supply 1544 are coupled to the system-on-chip device 1522. Moreover, in a particular aspect, as illustrated in FIG. 15, the visual interface device 140, the input device 1530, the speakers 1536, the microphones 142, the antenna 1542, and the power supply 1544 are external to the system-on-chip device 1522. However, each of the visual interface device 140, the input device 1530, the speakers 1536, the microphones 142, the antenna 1542, and the power supply 1544 can be coupled to a component of the system-on-chip device 1522, such as an interface or a controller. In an illustrative example, the device 1500 corresponds to a virtual assistant, a home appliance, a smart device, an internet of things (IoT) device, a communication device, a computer, a display device, a television, a gaming console, a music player, a radio, a video player, an entertainment unit, a personal media player, a digital video player, a camera, a navigation device, a mobile communication device, a smartphone, a cellular phone, a laptop computer, a tablet computer, a personal digital assistant, a display device, an optical disc player, a tuner, a decoder system, an encoder system, or any combination thereof.

In conjunction with the described aspects, an apparatus is disclosed that includes means for receiving real-time status information associated with one or more occupants of the building. The status information includes at least one of dynamic location information or dynamic activity information. For example, the means for receiving the real-time status information may correspond to the receiver 222, the processor 108, the transceiver 1540, one or more other circuits or devices configured to receive the status information, or any combination thereof.

The apparatus includes means for providing a visual representation of at least a portion of the building and the status information associated with the one or more occupants. For example, the means for providing may correspond to the visual interface device 140, the processor 108, the output generator 260, one or more other circuits or devices configured to provide the visual representation, or any combination thereof.

The apparatus includes means for receiving user input regarding control of one or more controllable devices of the building. For example, the means for receiving the user input may correspond to the microphone 142, the speech recognition engine 118, the touchscreen 246, the touch recognition unit 220, the sensor 244, the gesture recognition unit 218, the input device 1530, the processor 108, the input recognition engine 302, one or more other circuits or devices configured to receive the user input, or any combination thereof.

The apparatus includes means for generating an instruction to adjust operation of the one or more controllable devices based on the user input. For example, the means for generating the instruction may correspond to the processor 108, the instruction generator 262, one or more other circuits or devices configured to generate the instruction, or any combination thereof.

In some implementations, the user input is received via a means for performing a speech recognition operation, such as the speech recognition engine 118, the processor 108, the input recognition engine 302, one or more other circuits or devices configured to perform the speech recognition operation, or any combination thereof.

In some implementations, the user input is received via at least one of a means for performing a gesture recognition operation or a means for performing a touch detection operation. For example, the means for performing the gesture recognition operation may correspond to the sensor 244, the gesture recognition unit 218, the processor 108, the input recognition engine 302, one or more other circuits or devices configured to perform the gesture recognition operation, or any combination thereof. As another example, the means for performing the touch recognition operation may correspond to the touchscreen 246, the touch recognition unit 220, the processor 108, the input recognition engine 302, one or more other circuits or devices configured to perform the touch recognition operation, or any combination thereof.

In some implementations, the apparatus includes means for selectively restricting at least one of control of the controllable devices or access to at least a portion of the status information based on whether a user is an authorized user. For example, the means for selectively restricting may correspond to the processor 108, the user verifier 264, one or more other circuits or devices configured to selectively restrict at least one of control of the controllable devices or access to at least a portion of the status information based on whether a user is an authorized user, or any combination thereof.

As used herein, "coupled" may include communicatively coupled, electrically coupled, magnetically coupled, physically coupled, optically coupled, and combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc.

As used herein, "generating," "calculating," "using," "selecting," "accessing," and "determining" may be used interchangeably. For example, "generating," "calculating," or "determining" a value, a characteristic, a parameter, or a signal may refer to actively generating, calculating, or determining a value, a characteristic, a parameter, or a signal or may refer to using, selecting, or accessing a value, a characteristic, a parameter, or a signal that is already generated, such as by a component or a device.

Those of skill would further appreciate that the various illustrative logical blocks, configurations, modules, circuits, and algorithm steps described in connection with the aspects disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device to provide information to a visual interface device that is mountable to a vehicle dashboard, in a vehicle, the device comprising:
   a memory configured to store device information indicative of controllable devices of a building and occupant data indicative of one or more occupants of the building; and
   a processor configured to:
   receive, in real-time, status information associated with the one or more occupants of the building, the status information including at least one of dynamic location information or dynamic activity information;
   receive, from the vehicle dashboard, user input from a single authorized user, related to control of one or more controllable devices of the building;
   generate, based on the single authorized user being the only occupant of the vehicle, an output to provide, at the visual interface device, a visual representation, incorporating the status information and information regarding the controllable devices, of at least a portion of the building and the status information associated with the one or more occupants of the building; and
   generate an instruction to adjust an operation of one or more devices of the controllable devices based on the user input.

2. The device of claim 1, wherein the processor, the memory, and the visual interface device are integrated into a vehicle dashboard device.

3. The device of claim 1, wherein the status information further includes at least one of an age or an emotional status of at least one of the one or more occupants of the building.

4. The device of claim 1, further comprising a speech recognition engine configured to receive an audio signal corresponding to audible user speech and to translate the audio signal into the user input.

5. The device of claim 4, further comprising a microphone coupled to the speech recognition engine and configured to capture the audible user speech and to generate the audio signal.

6. The device of claim 1, further comprising a gesture recognition unit configured to receive a sensor signal corresponding to a user gesture and to translate the sensor signal into the user input.

7. The device of claim 6, further comprising at least one of a camera, an infrared sensor, or an ultrasonic sensor coupled to the gesture recognition unit and configured to capture the user gesture and to generate the sensor signal.

8. The device of claim 1, further comprising a touch recognition unit configured to receive a touch detection signal corresponding to a user touch and to translate the touch detection signal into the user input.

9. The device of claim 8, further comprising a touchscreen coupled to the touch recognition unit and configured to display the visual representation and to generate the touch detection signal.

10. The device of claim 1, wherein the processor is further configured to selectively restrict control of the controllable devices based on the user input.

11. The device of claim 1, wherein the processor is further configured to selectively restrict access to at least a portion of the status information based on the user input.

12. The device of claim 1, further comprising a transmitter coupled to the processor and configured to transmit the instruction to the one or more devices.

13. The device of claim 1, wherein the instruction includes at least one of an instruction to cause a climate control device in the building to adjust a temperature, an instruction to adjust a lighting level in at least one room of the building, or an instruction to adjust playback settings of an entertainment system in the building.

14. A method for providing information associated with occupants of a building, the method comprising:
   receiving, in real-time at a dashboard device, wherein the dashboard device is in a vehicle, status information associated with one or more occupants of the building, the status information including at least one of dynamic location information or dynamic activity information;
   receiving, from the dashboard device, user input from a single authorized user in the vehicle, related to control of one or more controllable devices of the building;

generating, based on the single authorized user being the only occupant of the vehicle, at a visual interface of the dashboard device, a visual representation, incorporating the status information and information regarding the controllable devices, of at least a portion of the building and of the status information associated with the one or more occupants of the building; and generating, at the dashboard device, an instruction to adjust an operation of the one or more controllable devices based on the user input.

15. The method of claim 14, wherein the user input is received via a speech recognition operation.

16. The method of claim 14, wherein the user input is received via at least one of a gesture recognition operation or a touch detection operation.

17. The method of claim 14, further comprising:
selectively restricting at least one of control of the controllable devices or access to at least a portion of the status information based on authorized use by the authorized user.

18. The method of claim 14, wherein the status information further includes that a first occupant of the building is watching television in a living room and that a second occupant of the building is in a bed in a bedroom,
wherein the user input includes an instruction to lower a volume of the television, and
wherein the instruction is transmitted to the television to cause the television to lower the volume.

19. A non-transitory computer-readable medium comprising instructions that, when executed by one or more processors, cause the one or more processors to:
receive, in real-time at a dashboard device in a vehicle, status information associated with one or more occupants of a building, the status information including at least one of dynamic location information or dynamic activity information;
receive, from the dashboard device, user input from a single authorized user to control one or more controllable devices of the building;
generate based on the single authorized user being the only occupant of the vehicle, an output for a visual interface device to provide a visual representation incorporating, the status information and information regarding the controllable devices, of at least a portion of the building and the status information associated with the one or more occupants of the building; and
generate an instruction to adjust an operation of the one or more controllable devices based on the user input.

20. The non-transitory computer-readable medium of claim 19, wherein the dynamic activity information indicates an activity associated with each of the one or more occupants of the building, and wherein the dynamic location information indicates a location within the building of the one or more occupants.

21. The non-transitory computer-readable medium of claim 19, wherein the user input is received via at least one of a speech recognition operation, a gesture recognition operation or a touch detection operation.

22. The non-transitory computer-readable medium of claim 19, wherein the instructions, when executed by the one or more processors, further cause the one or more processors to:
selectively restrict at least one of control of the controllable devices or access to at least a portion of the status information based on authorized use by the authorized user.

23. An apparatus to perform operations to provide information about occupants of a building, the apparatus comprising:
means for receiving, in real-time at a dashboard device in a vehicle, status information associated with one or more occupants of the building, the status information including at least one of dynamic location information or dynamic activity information;
means for receiving, from the dashboard device, user input from a single authorizer user, related to control of one or more controllable devices of the building;
means for providing, based on the single authorized user being the only occupant of the vehicle, a visual representation, incorporating the status information and information regarding the controllable devices, of at least a portion of the building and the status information associated with the one or more occupants of the building; and
means for generating an instruction to adjust an operation of the one or more controllable devices based on the user input.

24. The apparatus of claim 23, wherein the user input is received via a means for performing a speech recognition operation.

25. The apparatus of claim 23, wherein the user input is received via at least one of a means for performing a gesture recognition operation or a means for performing a touch detection operation.

26. The apparatus of claim 23, further comprising means for selectively restricting at least one of control of the controllable devices or access to at least a portion of the status information based on authorized use by an authorized user.

27. A device to provide information to a visual interface device that is mountable to a vehicle dashboard, in a vehicle, the device comprising:
a memory configured to store device information indicative of controllable devices of a building and occupant data indicative of one or more occupants of the building; and
a processor configured to:
receive, in real-time, status information associated with the one or more occupants of the building, the status information including at least one of dynamic location information or dynamic activity information;
receive, from the vehicle dashboard, user input from a person in the vehicle;
generate, based on multiple people being in the vehicle, an output to provide, at the visual interface device, a visual representation, of at least a portion of the building and the status information associated with the one or more occupants;
generate an instruction to adjust an operation of one or more devices of the controllable devices based on the user input; and
holographically displaying different screens in the vehicle for different people in the vehicle.

28. A device to provide information to a visual interface device that is mountable to a vehicle dashboard, in a vehicle, the device comprising:
a memory configured to store device information indicative of controllable devices of a building and occupant data indicative of one or more occupants of the building; and
a processor configured to:
receive, in real-time, status information associated with the one or more occupants of the building, the status information including at least one of dynamic location information or dynamic activity information;

receive, from the vehicle dashboard, user input from a person in the vehicle;

generate, based on multiple people being in the vehicle and the vehicle being in an emergency situation, an output to provide, at the visual interface device, a visual representation incorporating the status information and information regarding the controllable devices, without restriction, of at least a portion of the building and the status information associated with the one or more occupants;

generate an instruction to adjust an operation of one or more devices of the controllable devices based on the user input; and holographically displaying different screens in the vehicle for different people in the vehicle.

29. A device to provide information to a visual interface device that is mountable to a vehicle dashboard, in a vehicle, the device comprising:

a memory configured to store device information indicative of controllable devices of a building and occupant data indicative of one or more occupants of the building; and a processor configured to:

receive, in real-time, status information associated with the one or more occupants of the building, the status information including at least one of dynamic location information or dynamic activity information;

receive, from the vehicle dashboard, user input from an unauthorized user in the vehicle;

generate, based on the unauthorized user being the only occupant of the vehicle, an output to provide, at the visual interface device, a visual representation that omits the status information and omits information regarding controllable devices in non-public areas of the building, of at least a portion of the building and the status information associated with the one or more occupants of the building; and generate an instruction to adjust an operation of one or more devices of the controllable devices based on the user input.

* * * * *